(12) United States Patent
Suh et al.

(10) Patent No.: US 9,549,228 B2
(45) Date of Patent: *Jan. 17, 2017

(54) BROADCAST SIGNAL PROCESSING METHOD AND DEVICE FOR 3-DIMENSIONAL (3D) BROADCASTING SERVICE

(75) Inventors: Jongyeul Suh, Seoul (KR); Joonhui Lee, Seoul (KR); Jeehyun Choe, Seoul (KR); Jeonghyu Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 710 days.

This patent is subject to a terminal disclaimer.

(21) Appl. No.: 13/819,982

(22) PCT Filed: Sep. 1, 2011

(86) PCT No.: PCT/KR2011/006490
§ 371 (c)(1),
(2), (4) Date: Feb. 28, 2013

(87) PCT Pub. No.: WO2012/030176
PCT Pub. Date: Mar. 8, 2012

(65) Prior Publication Data
US 2013/0162771 A1    Jun. 27, 2013

Related U.S. Application Data

(60) Provisional application No. 61/379,380, filed on Sep. 1, 2010.

(51) Int. Cl.
H04N 13/00    (2006.01)
H04N 13/04    (2006.01)
(Continued)

(52) U.S. Cl.
CPC ........ *H04N 21/816* (2013.01); *H04N 13/0048* (2013.01); *H04N 13/0059* (2013.01);
(Continued)

(58) Field of Classification Search
CPC .............. H04N 13/0048; H04N 21/816; H04N 13/0062; H04N 21/6336; H04N 21/2362; H04N 13/0059; H04N 21/23614
(Continued)

(56) References Cited

U.S. PATENT DOCUMENTS 9,041,772 B2 *  5/2015  Suh .................... H04N 13/0059
                                                        348/42
2010/0271465 A1 * 10/2010 Lee .................... H04N 13/0048
                                                        348/51
(Continued)

FOREIGN PATENT DOCUMENTS

KR    10-2010-0049873 A    5/2010
KR    10-2010-0086440 A    7/2010
(Continued)

Primary Examiner — Dave Czekaj
Assistant Examiner — Alison Slater
(74) Attorney, Agent, or Firm — Dentons US LLP

(57) ABSTRACT

The present invention relates to a broadcast signal processing method and device for 3D broadcasting service. The broadcast signal processing method according to an embodiment of the present invention includes: encoding 3D video broadcast data that includes left image broadcast data having a left image and right image broadcast data having a right image to provide 3D effects; encoding signaling information for signaling the encoded 3D video broadcast data; generating a broadcast signal including the encoded 3D video broadcast data and the encoded signaling information; and transmitting the generated broadcast signal.

11 Claims, 24 Drawing Sheets

(51) Int. Cl.
  *H04N 5/44*       (2011.01)
  *H04L 5/16*       (2006.01)
  *H04N 21/81*      (2011.01)
  *H04N 21/236*     (2011.01)
  *H04N 21/2362*    (2011.01)
  *H04N 21/6336*    (2011.01)

(52) U.S. Cl.
  CPC ..... *H04N 13/0062* (2013.01); *H04N 21/2362* (2013.01); *H04N 21/23614* (2013.01); *H04N 21/6336* (2013.01)

(58) Field of Classification Search
  USPC .......................................................... 348/43
  See application file for complete search history.

(56) References Cited

U.S. PATENT DOCUMENTS

2010/0315493 A1* 12/2010 Hamada ............. H04N 13/0048
                                                            348/51
2013/0106998 A1*  5/2013 Pahalawatta ....... H04N 13/0029
                                                            348/43
2013/0242050 A1*  9/2013 Choi .................... H04N 13/004
                                                            348/43

FOREIGN PATENT DOCUMENTS

KR    WO 2012070715 A1 *  5/2012  ........... H04N 13/004
WO    WO 2010-095443 A1   8/2010
WO    WO 2012006299 A1 *  1/2012  ......... H04N 13/0029

* cited by examiner

FIG. 2

| Syntax | No. of bits | Mnemonics |
|---|---|---|
| 3DTV_service_location_descriptor ( ) { | | |
| descriptor_tag | 8 | 0xTBD |
| descriptor_length | 8 | uimsbf |
| reserved | 3 | '111' |
| PCR_PID | 13 | uimsbf |
| reserved | 1 | '1' |
| number_elements | 7 | uimsbf |
| for (j=0; j<number_elements; j++) { | | |
| elementary_PID | 13 | uimsbf |
| left_right_view | 1 | bslbf |
| primary_video_flag | 1 | bslbf |
| reserved | 1 | '1' |
| stream_type | 8 | uimsbf |
| resolution_type | 2 | uimsbf |
| stereo_format_type | 6 | uimsbf |
| filter_type | 8 | uimsbf |
| number_horizontal_taps | 8 | uimsbf |
| for (k=0; k < number_horizontal_taps; k++) { | | |
| hor_coefficient_den | 8 | simsbf |
| hor_coefficient_num | 8 | uimsbf |
| } | | |
| number_vertical_taps | 8 | uimsbf |
| for (k=0; k < number_vertical_taps; k++) { | | |
| ver_coefficient_den | 8 | simsbf |
| ver_coefficient_num | 8 | uimsbf |
| } | | |
| } | | |
| } | | |

FIG. 3

| Syntax | No. of bits | Format |
|---|---|---|
| terrestrial_virtual_channel_table_section () { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i<num_channels_insection; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequnecy | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptor_length | 10 | uimsbf |
|   for (j=0; j<N; j++) { | | |
|     additional_descriptor() | | |
|   } | | |
|   CRC_32 | 32 | rpchof |
| } | | |

- service_type → indicate 3DTV service
- descriptor() → include information on two video streams configuring stereoscopic 3DTV service

| Value | Type |
|---|---|
| 0x11 | ATSC Stereoscopic 3DTV service – The virtual channel carries 3D television programming (audio, video, and additional video stream to enable Stereoscopic Video service) |

FIG. 4

| Syntax | No. of bits | Mnemonic |
|---|---|---|
| 3DTV_service_location_descriptor ( ) { | | |
| descriptor_tag | 8 | 0xTBD |
| descriptor_length | 8 | uimsbf |
| left_right_view | 8 | uimsbf |
| reserved | 7 | bslbf |
| primary_video_flag | 1 | bslbf |
| resolution_type | 2 | uimsbf |
| stereo_format_type | 6 | uimsbf |
| filter_type | 8 | uimsbf |
| number_horizontal_taps | 8 | uimsbf |
| for (k=0; k < number_horizontal_taps; k++) { | | |
| hor_coefficient_den | 8 | simsbf |
| hor_coefficient_num | 8 | uimsbf |
| } | | |
| number_vertical_taps | 8 | uimsbf |
| for (k=0; k < number_vertical_taps; k++) { | | |
| ver_coefficient_den | 8 | simsbf |
| ver_coefficient_num | 8 | uimsbf |
| } | | |
| } | | |

FIG. 5

| Syntax | No. of bits | Mnemonic |
|---|---|---|
| TS_program_map_section( ) { | | |
|   table_id | 8 | uimsbf |
|   section_syntax_indicator | 1 | Bslbf |
|   '0' | 1 | Bslbf |
|   reserved | 2 | Bslbf |
|   section_length | 12 | uimsbf |
|   program_number | 16 | uimsbf |
|   reserved | 2 | Bslbf |
|   version_number | 5 | uimsbf |
|   current_next_indicator | 1 | Bslbf |
|   section_number | 8 | uimsbf |
|   last_section_number | 8 | uimsbf |
|   reserved | 3 | Bslbf |
|   PCD_PID | 13 | uimsbf |
|   reserved | 4 | Bslbf |
|   program_info_length | 12 | uimsbf |
|   for (i=0; i < N; i ++) { | | |
|     descriptor() | | |
|   } | | |
|   for (i=0; i < N1; i ++) { | | |
|     stream_type | 8 | uimsbf |
|     reserved | 3 | Bslbf |
|     elementary_PID | 13 | uimsbf |
|     reserved | 4 | Bslbf |
|     ES_info_length | 12 | uimsbf |
|     for (i = 0; i < N2; i++) { | | |
|       descriptor() | | |
|     } | | |
|   } | | |
|   CRC_32 | 32 | rpchof |
| } | | | location of 3DTV_service_location_descriptor_PMT

FIG. 6

| Syntax | No. of bits | Mnemonics |
|---|---|---|
| 3DTV_service_location_descriptor ( ) { | | |
| descriptor_tag | 8 | 0xTBD |
| descriptor_length | 8 | uimsbf |
| reserved | 1 | '1' |
| number_elements | 7 | uimsbf |
| for (j=0; j<number_elements; j++) { | | |
| component_tag | 8 | uimsbf |
| left_right_view | 1 | bslbf |
| primary_video_flag | 1 | bslbf |
| reserved | 6 | '111111' |
| stream_type | 8 | uimsbf |
| resolution_type | 2 | uimsbf |
| stereo_format_type | 6 | uimsbf |
| filter_type | 8 | uimsbf |
| number_horizontal_taps | 8 | uimsbf |
| for (k=0; k < number_horizontal_taps; k++) { | | |
| hor_coefficient_den | 8 | simsbf |
| hor_coefficient_num | 8 | uimsbf |
| } | | |
| number_vertical_taps | 8 | uimsbf |
| for (k=0; k < number_vertical_taps; k++) { | | |
| ver_coefficient_den | 8 | simsbf |
| ver_coefficient_num | 8 | uimsbf |
| } | | |
| } | | |
| } | | |

FIG. 7

| Syntax | No. of bits | Mnemonic |
|---|---|---|
| service_description_section ( ) { | | |
| table_id | 8 | uimsbf |
| section_syntax_indicator | 1 | bslbf |
| reserved_future_use | 1 | bslbf |
| reserved | 2 | bslbf |
| section_length | 12 | uimsbf |
| transport_stream_id | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| original_network_id | 16 | uimsbf |
| reserved_future_use | 8 | bslbf |
| for (i = 0; i < N; i++) { | | |
| service_id | 16 | uimsbf |
| reserved_future_use | 6 | bslbf |
| EIT_schedule_flag | 1 | bslbf |
| EIT_present_following_flag | 1 | bslbf |
| running_status | 3 | uimsbf |
| free_CA_mode | 1 | bslbf |
| descriptors_loop_length | 12 | uimsbf |
| for (j = 0; j < N; j++) { | | |
| descriptor ( ) | | |
| } | | |
| } | | |
| CRC_32 | 32 | rpchof |
| } | | |

1. inform that it is 3D stereoscopic video service via service_type in service descriptor 2. inform that it is 3D stereoscopic video service via 3D service location descriptor

FIG. 8

| service_type | Description |
|---|---|
| 0X00 | reserved for future use |
| 0X01 | digital television service(see note 1) |
| 0X02 | digital television service(see note 2) |
| 0X03 | Teletext service |
| 0X04 | NVOD reference service(see note 1) |
| 0X05 | NVOD time-shigted service(see note 1) |
| 0X06 | mosaic service |
| 0X07 | FM radio service |
| 0X08 | DVB SRM service[48] |
| 0X09 | reservde for future use |
| 0X0A | advanced cidec digital radio sound service |
| 0X0B | advanced cidec mosaic service |
| 0X0C | data vroadcast service |
| 0X0D | reserved for Common interface Usage(EN 50221[37]) |
| 0X0E | RCS Map(see EN 301 790[7]) |
| 0X0F | RCS FLS(see EN 301 790[7]) |
| 0X10 | DVB MHP service |
| 0X11 | MPEG-2 HD digital television service |
| 0X12 to 0X15 | reservde for future use |
| 0X16 | advanced cod codec SD dugital television service |
| 0X17 | advanced cod codec SD NVOD time-shifted service |
| 0X18 | advanced cod codec SD NVOD reference service |
| 0X19 | advanced cod codec HD digital television service |
| 0X1A | advanced cod codec HD NVOD time-shifted service |
| 0X1B | advanced cod codec HD NVOD reference service |
| 0X1C to 0X7F | reserved for future use |
| 0X80 to 0XFE | user defined |
| 0XFF | reserved for future use |
| NOTE 1 : MPEG-2 SD mtterial should use this type. | |
| NOTE 2 : MPEG-1 Layer 2 audio mateeial should use this type. | |

| Service_type | Description |
|---|---|
| 0x12 | DVB Stereoscopic 3DTV service – The virtual channel carries 3D television programming (audio, video, and additional video stream to enable Stereoscopic Video service) |

FIG. 9

| Syntax | Bits | Identifier |
|---|---|---|
| component_descriptor( ){ | | |
|     descriptor_tag | 8 | uimsbf |
|     descriptor_length | 8 | uimsbf |
|     resrved_future_use | 4 | Bslbf |
|     stream_content | 4 | uimsbf |
|     component_type | 8 | uimsbf |
|     component_tag | 8 | uimsbf |
|     ISO 639-2 [3] _language_code | 24 | Bslbf |
|     for (i=0;<N;i + +){ | | |
|         text_char | 8 | uimsbf |
|     } | | |
| } | | |

FIG. 10

| Stream_content | Component_type | Description |
|---|---|---|
| 0x01 | 0x01 | MPEG-2 video, 4:3 aspect ratio, 25Hz |
| 0x01 | 0x05 | MPEG-2 video, 4:3 aspect ratio, 30Hz |
| 0x01 | 0x13 | MPEG-2 video, Half Resolution 2D Secondary video for 3D Stereoscopic service, 25Hz |
| 0x01 | 0x14 | MPEG-2 video, Half Resolution 2D Secondary video for 3D Stereoscopic service, 30Hz |
| 0x05 | 0x01 | H.264/AVC standard definition video, 4:3 aspect ratio, 25Hz |
| 0x05 | 0x05 | H.264/AVC standard definition video, 4:3 aspect ratio, 30Hz |
| 0x05 | 0x13 | AVC/H.264 video, Half Resolution 2D Secondary video for 3D Stereoscopic service, 25Hz |
| 0x05 | 0x14 | AVC/H.264 video, Half Resolution 2D Secondary video for 3D Stereoscopic service, 30Hz |

FIG. 16

```
<simpleType name="TypeOfSourceType">
<restriction base="string">
<enumeration value="HD"/>
<enumeration value="SD"/>
<enumeration value="PIP"/>
<enumeration value="SdBarker"/>
<enumeration value="HdBarker"/>
<enumeration value="PipBarker"/>
<enumeration value="3DHD"/>
<enumeration value="3DSD"/>
<enumeration value="HalfResolution2DSecondaryVideofor3D"/>
</restriction>
</simpleType>
```

FIG. 18

```
<complexType name="VideoCompositionInformationFor3DType">
  <sequence>
    <element name="HorizontalTap" minOccurs="0" maxOccurs="unbounded">
      <complexType>
        <sequence>
          <element name="HorCoefficientDen" type="short"/>
          <element name="HorCoefficientNum" type="unsignedByte"/>
        </sequence>
      </complexType>
    </element>
    <element name="VerticalTap" minOccurs="0" maxOccurs="unbounded">
      <complexType>
        <sequence>
          <element name="VerCoefficientDen" type="short"/>
          <element name="VerCoefficientNum" type="unsignedByte"/>
        </sequence>
      </complexType>
    </element>
  </sequence>
  <attribute name="PrimaryVideoFlag" type="boolean" use="required"/>
  <attribute name="ResolutionType" type="unsignedByte" use="required"/>
  <attribute name="StereoFormatType" type="unsignedByte" use="required"/>
  <attribute name="FilterType" type="unsignedByte" use="required"/>
</complexType>
```

BROADCAST SIGNAL PROCESSING METHOD AND DEVICE FOR 3-DIMENSIONAL (3D) BROADCASTING SERVICE

This application is a 35 USC §371 National Stage entry of International Application No. PCT/KR2011/006490 filed on Sep. 1, 2011, and claims priority of U.S. Provisional Application No. 61/379,380 filed on Sep. 1, 2010, all of which are incorporated by reference in their entirety herein.

TECHNICAL FIELD

The present invention relates to a method of providing, receiving and processing a 3D (3-dimensional hereinafter abbreviated 3D) broadcasting service and apparatus thereof. More particularly, the present invention relates to a method of generating, receiving and processing a 3D broadcast signal capable of being simultaneously processed by both a 3D broadcast receiver capable of processing the 3D broadcasting service and a 2 dimensional broadcast receiver capable of processing a legacy 2 dimensional broadcasting service only.

BACKGROUND ART

As the dissemination of a 3 dimensional television (3DTV) is raging, a transmission of a 3D video content performed by a digital broadcasting as well as the dissemination of the 3D video content performed by a storing media is vitalized.

In general, a 3 dimensional video provides a 3D effect using a principle of stereo vision of two eyes. Since a human feels perspective via parallax of two eyes, in other word, binocular parallax due to a space between two eyes apart from each other about 65 mm, the 3D video may provide the 3D effect and the perspective in a manner of providing a video, which makes a left eye and a right eye see a related plane video, respectively.

The 3D video display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables a 3D video effect in a manner of making the left eye and the right eye watch the left view image and the right view image respectively using a polarized glasses or a display device itself.

Meanwhile, as mentioned in the above, since a 3D broadcasting needs to make a 3D video by delivering a left and a right view, respectively and then properly processing them in the broadcasting receiver, a signaling information for processing a 3D broadcasting signal should be added.

The 3D broadcasting receiver capable of receiving and processing the 3D broadcasting is required a relatively higher level of hardware and processing capability in comparison with a legacy broadcasting receiver. Hence, it is necessary to have a plan for enabling a 3D broadcasting signal transmitted in a same broadcasting bandwidth to be properly used as a 2 dimensional broadcasting in a manner of receiving by a 2D broadcasting receiver as well.

Yet, it is practically impossible to transmit the 3D broadcasting signal and the 2D broadcasting signal in accordance with each of the broadcasting receivers, respectively. Or, it may cause a problem that the quality of broadcasting video should be degraded if it happens.

DISCLOSURE OF THE INVENTION

Technical Tasks

A technical task that the present invention intends to achieve is to generate and process a 3D broadcasting signal having compatibility with a 3D broadcasting receiver and a 2D broadcasting receiver to obviate the aforementioned problem.

A different technical task that the present invention intends to achieve is to properly provide a signaling information for a 3D broadcasting in order for a 3D broadcasting receiver to efficiently process a 3D broadcasting signal.

Technical Solution

To achieve the aforementioned technical tasks and in accordance with the purpose of the present invention, as embodied and broadly described, according to one embodiment of the present invention a method of processing a broadcasting signal for a 3D (3-dimensional) broadcasting service includes the steps of encoding a 3D video broadcasting data which includes a left video broadcasting data containing a left video and a right video broadcasting data containing aright video thereto to indicate a 3D effect, encoding a signaling information to signal the encoded 3D video broadcasting data, generating a broadcasting signal which includes the encoded 3D video broadcasting data and the encoded signaling information thereto, and transmitting the generated broadcasting signal. In this case, the signaling information includes resolution type information indicating whether the left and/or the right video broadcasting data are a full resolution video or a half resolution video.

Preferably, the resolution type information is encoded as signaling information in a manner of being included in a 3DTV service location descriptor which signals information on 3D video components and the 3DTV service location descriptor is included in a program map table (PMT) and/or a service description table (SDT).

Preferably, the signaling information further includes information indicating which data is provided as a 2D video broadcasting data for a 2D receiver among the left and the right video broadcasting data.

Preferably, the resolution type information, if the left and/or the right video broadcasting data is a half resolution video, indicates whether the left and/or the right video broadcasting data is a vertical half resolution, a horizontal half resolution, or a vertical and horizontal half resolution.

Preferably, the 3DTV service location descriptor, if one of the left and the right video broadcasting data is a half resolution and the other is a full resolution, further includes a filter type information indicating a kind of filter used for doubling the half resolution video broadcasting data into the full resolution or the kind of filter used for reducing the full resolution video broadcasting data to the half resolution.

Preferably, the 3DTV service location descriptor further includes information on a filter size indicating a size of the filter.

Preferably, the 3DTV service location descriptor further includes information indicating whether the video broadcasting data included in the broadcasting signal is the left or the right video broadcasting data.

To further achieve these and other advantages and in accordance with the purpose of the present invention, according to one embodiment of the present invention a 3D broadcasting service receiving device includes a receiving unit configured to receive a 3D video broadcasting data which includes a left video broadcasting data containing a left video and a right video broadcasting data containing a right video thereto to indicate a 3D effect and a signaling information to signal the 3D video broadcasting data, a system information processor configured to parse a resolution type information indicating whether the left and/or the right video broadcasting data included in the signaling information is a full or a half resolution video, a video decoder configured to decode the left and the right video broadcasting data, and a formatter configured to form a 3D video for a 3D display in a manner of doubling or reducing one of the decoded left and the right video broadcasting data into a full or a half resolution using the resolution type information.

Preferably, the system information processor interprets a service type information indicating a kind of service included in the SDT and identifies the broadcasting signal aimed for a 3D broadcasting service according to whether the 3DTV service location descriptor exists or not.

Preferably, a broadcasting receiver includes a function unit for performing characteristics of the aforementioned present invention.

Advantageous Effects

According to the present invention, the present invention is able to deliver signaling information for 3D broadcasting service in a conventional broadcasting service signaling structure.

According to the present invention, the present invention is able to provide a 3D broadcasting signal having compatibility with a 2D broadcasting receiver without deterioration of the quality of 3D broadcasting in either case that the 3D broadcasting is provided with full resolution or half resolution.

DESCRIPTION OF DRAWINGS

FIG. 2 is a diagram for showing a syntax structure of a 3DTV service location descriptor according to one embodiment of the present invention;

FIG. 3 is a diagram for showing a location of a 3DTV service location descriptor included in a terrestrial virtual channel table (TVCT) and a definition of a service_type field according to one embodiment of the present invention;

FIG. 4 is a diagram for showing a 3DTV service location descriptor according to a different embodiment of the present invention;

FIG. 5 is a diagram for showing a location of 3DTV service location descriptor included in a program map table (PMT) according to one embodiment of the present invention;

FIG. 6 is a diagram for showing a 3DTV service location descriptor according to a different embodiment of the present invention;

FIG. 7 a diagram for showing a location of 3DTV service location descriptor included in a service description table (SDT) according to one embodiment of the present invention;

FIG. 8 is a diagram for showing a description in accordance with a value of service_type field according to one embodiment of the present invention;

FIG. 9 is a diagram for showing a component descriptor according to one embodiment of the present invention;

FIG. 10 is a diagram for showing a description of stream_content and component_type according to one embodiment of the present invention;

FIG. 16 is a diagram for showing TypeOfSourceType XML schema expanded to signal information on primary or secondary video for 3D broadcasting service according to one embodiment of the present invention;

FIG. 18 is a diagram for showing XML schema of VideoCompositionInformationFor3DType to include 3D video composition information according to one embodiment of the present invention;

BEST MODE

Figure 1:
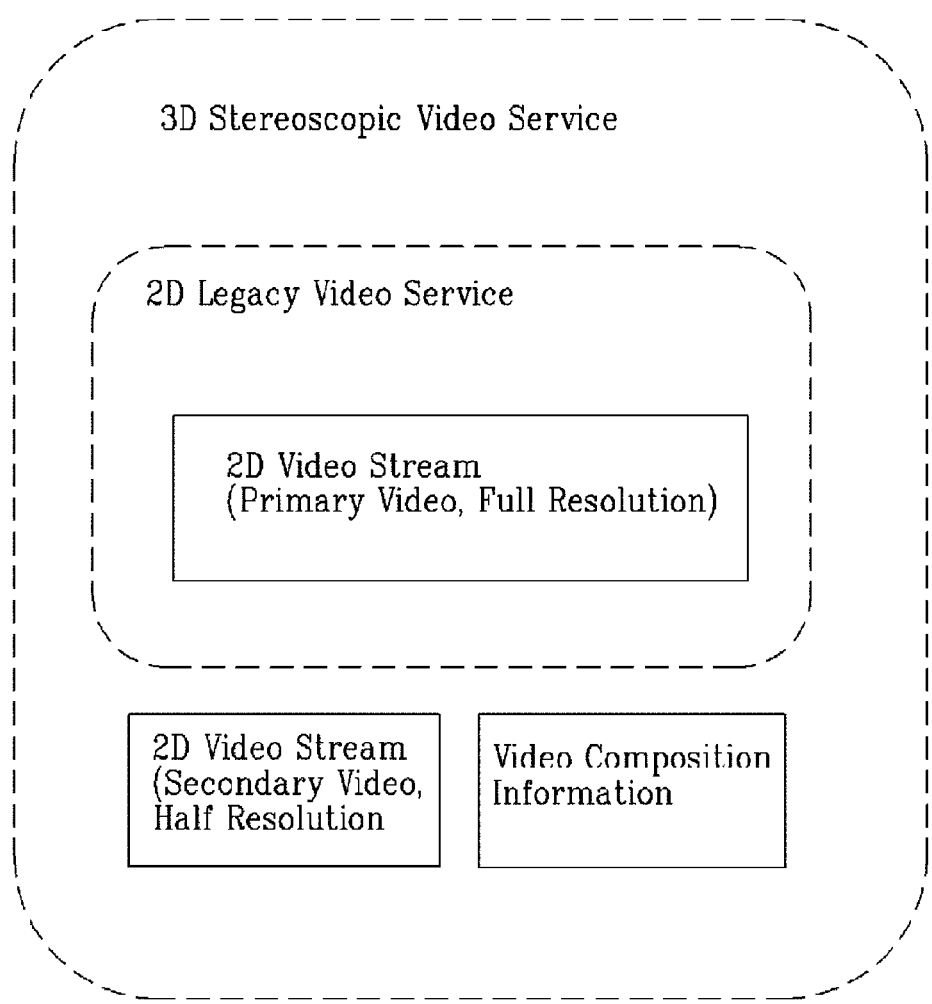
FIG. 1 is a diagram for showing a configuration of video element for a 3D broadcasting service according to one embodiment of the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The method of expression for a 3 dimensional video may include a stereoscopic technique considering two viewpoints and a multiple view image technique (or a multi-view technique) considering more than 3 viewpoints. Comparably, a conventional single view image technique may be called a monoscopic video technique.

The stereoscopic technique uses a pair of images, i.e., a left view image and a right view image obtained by photographing a same subject with a left camera and a right camera, which are away a certain distance from each other. The multi-view technique uses more than 3 images obtained by photographing with 3 or more cameras having a certain distance and angle. In the following description, although the present invention explains the stereoscopic technique as one embodiment, the idea of the present invention may also be applied to the multi-view technique.

According to the present invention, the stereoscopic technique includes a side-by-side, a top-down, a checker board technique, and the like. The side-by-side technique is a technique configuring one stereoscopic video by performing a half down sampling horizontally on each of a left video and a right video, respectively and situating one sampled video in a left region and the other sampled video in a right region. The top-down technique is a technique configuring one stereoscopic video by performing a half down sampling vertically on each of a left video and a right video, respectively and situating one sampled video in a top region and the other sampled video in a bottom region. The checker board technique is a technique configuring one video by performing a half down sampling in a manner that a left image and a right image respectively intersect horizontally and vertically. Yet, the stereoscopic technique according to the present invention may be non-limited or non-restricted by the aforementioned example.

When a 3D video is intended to be transmitted, one of the considerations is compatibility with a 2 dimensional video. Because a receiver not supportive of a 3D video display should display a 3D video, which is included in a received broadcasting signal as a 2D video and a 3DTV should be able to display a 2D video as well, if necessary.

FIG. 1 is a diagram for showing a configuration of video element for a 3D broadcasting service according to one embodiment of the present invention.

According to one embodiment of the present invention, a video element of a 3D broadcasting service may include a primary video stream, a secondary video stream and/or a video composition information.

The primary video stream can be used for maintaining compatibility with a 2D broadcasting receiver as well as a 3D broadcasting receiver. For instance, the 2D broadcasting receiver receives the primary video stream among the video elements included in a 3D broadcasting signal and may be able to provide a 2D broadcasting service in a manner of decoding the primary video stream. As mentioned in the above, a left and a right video are necessary to provide a 3D video. The primary video stream may be a video stream including either the left or the right video. Hence, the 2D broadcasting receiver may be able to provide a user with a 2D video in a manner of decoding either the left or the right video only and then displaying it using the primary video stream. In case that a viewer using a 3D broadcasting receiver attempts to watch a 2D video not a 3D video with the broadcasting receiver, the broadcasting receiver may be able to satisfy a demand of the viewer by providing the primary video stream in a manner of decoding it.

According to the embodiment of the present invention, the primary video stream may be a video of full resolution. Hence, a 2D broadcasting receiver using only the primary video stream may also be able to receive a video having no quality deterioration for a resolution.

Yet, while not so limited, the primary video stream can be configured to have a video of full resolution all the time but to transmit a video of half resolution. For instance, it is possible to enable the primary video stream to transmit a video of half resolution according to a situation of broadcasting bandwidth, possession status for 3D or 2D broadcasting receiver of viewers, and the like.

The secondary video stream may be able to transmit a video not transmitted by the primary video stream among the left video and the right video, which configure a 3D video. According to one embodiment of the present invention, the secondary video stream transmits a video of half resolution. It is because there is a limitation of broadcasting bandwidth and few need to transmit the secondary video stream used for a 3D broadcasting service as a video of full resolution. Yet, the secondary video stream is not always limited to transmit a video of half resolution and may be able to transmit a video of full resolution. This is because, if a broadcasting receiving side need to receive a 2D video, the broadcasting receiving side may choose to receive a video stream of a left or a right video as a 2D broadcasting video according to a preference of a viewer.

In order to display a 3D video with 2 video streams transmitting either a left or a right video in a 3D broadcasting service, information on the 3D broadcasting service and various informations on the 2 video streams should be additionally transmitted and received. The information on the 3D broadcasting service can be provided by a video composition information.

According to one embodiment of the present invention, the video composition information for the 3D broadcasting service can be transmitted in a manner of being included in PSI/PSIP of ATSC system. In this case, the video composition information can be transmitted in a manner of being included in a program map table (PMT) information contained in the PSI or a virtual channel table (VCT) information contained in the PSIP.

According to a different embodiment of the present invention, the video composition information for the 3D broadcasting service can be transmitted in a manner of being included in a signaling information of DVB system. In this case, the video composition information can be transmitted in a manner of being included in the PMT information or a service description table (SDT) information.

FIG. 2 is a diagram for showing a syntax structure of a 3DTV service location descriptor according to one embodiment of the present invention.

The 3DTV service location descriptor according to one embodiment of the present invention may include a descriptor_tag field, a descriptor_length field, a PCR_PID field, a number_elements field, a elementary_PID field, a left_right_ view field, a primary_video_flag field, a stream_type field, a resolution_type field, a stereo_format_type field, a filter_type field, a number_horizontal_taps field, a hor_coefficient_den field, a hor_coefficient_num field, a number_vertical_taps field, a ver_coefficient_den field and/or a ver_coefficient_num field.

The descriptor_tag field plays a role of identifying a descriptor to which this field belongs.

The descriptor_length field shows a length of data, which follows this field and belongs to the present descriptor, as bytes.

The PCR_PID field indicates a packet identifier (PID) of a transport stream including a PCR field.

The number_elements field indicates the number of elements configuring a 3D broadcasting service. A broadcasting receiver is able to parse the information included in the following fields as many as the number of video elements configuring the 3D broadcasting service in a manner of receiving 3DTV service location descriptor.

The elementary_PID field indicates the PID of the video element. The 3DTV service location descriptor defines following informations on the video element having the PID of the elementary_PID field. A broadcasting receiver may be able to obtain information for a 3D video display of the video element having a corresponding PID from the 3DTV service location descriptor.

The left_right_view field indicates whether a video element is the video data of a left view or the video data of a right view.

The primary_video_flag field indicates whether a video element is a video data capable of being played in a 2D legacy device. For instance, if a flag value is '1', it indicates a primary video data. If the flag value is '0', it may be able to indicate a secondary video data of half resolution.

The stream_type field indicates a coding type for a video element. For instance, it may indicate such a coding type as JPEG, MPEG-2, MPEG-4, H.264/AVC and/or H.264/MVC and the like.

The resolution_type field indicates information on the resolution of a video element. For instance, it may indicate whether a video data of a primary video data and/or a secondary video data is horizontally or vertically full resolution or half resolution. For instance, if a value of the resolution_type field is '00', it indicates that a video data is full resolution. If a value of the field is '01', it indicates that a video data is vertically half resolution. If a value of the field is '10', it indicates that a video data is horizontally half resolution. If a value of the field is '11', it indicates that a video data is horizontally/vertically half resolution. In particular, in this case, it may indicate quarter resolution.

The stereo_format_type field indicates that which format is applied to a primary video data and a secondary video data in order for the primary video data and the secondary video data to be multiplexed. A stereoscopic display format includes a side-by-side technique, a top-down technique, a checker board technique, a vertical line interlace technique, an horizontal line interlace technique, a frame sequential technique and the like. As one embodiment, in case that a broadcasting receiver or a display device only supports the format based upon half resolution for a left/right video data, it may be able to know a recommended stereoscopic display format using the stereo_format_type field.

The filter_type field indicates information on a filtering in case of resizing a video data. For instance, in case of performing a doubling to fit a secondary video data of half resolution into a primary video data of full resolution or in case of performing a half reducing to fit the primary video data of full resolution into the secondary video data of half resolution, the filter_type field may indicate the information on the filter type that used. As one embodiment, in case of resizing a video data, the filter_type field may be able to indicate an application direction of a filter (horizontal direction, vertical direction), information on a resizing ratio (e.g., doubling or half reducing) in case of resizing, a kind of filter (e.g., a bilinear interpolation, a bicubic interpolation, etc.) and the like. The filtering information included in the filter_type field may be called a resizing information in the following description.

The number_horizontal_taps field is a size of filter applied in case of performing a horizontal filtering and indicates the number of parameter of a filter.

The hor_coefficient_den field and/or the hor_coefficient_num field indicate a filter coefficient. Each filter coefficient may use the value resulted from dividing the value of hor_coefficient_den by the value of hor_coefficient_num (filter coefficient=hor_coefficient_den/hor_coefficient_num).

The number_vertical_taps field a size of filter applied in case of performing a vertical filtering and indicates the number of parameter of a filter.

The ver_coefficient_den field and/or the ver_coefficient_num field indicate a filter coefficient. Each filter coefficient may use the value resulted from dividing the value of the ver_coefficient_den by the value of the ver_coefficient_num (filter coefficient=ver_coefficient_den/ver_coefficient_num).

The filter-related information included in the 3DTV service location descriptor may be able to indicate that a horizontal/vertical filtering is performed.

The 3DTV service location descriptor may be situated at in the TVCT and may be able to signal information on the 3D video components configuring a corresponding virtual channel.

FIG. 3 is a diagram for showing a location of a 3DTV service location descriptor included in a terrestrial virtual channel table (TVCT) and a definition of a service_type field according to one embodiment of the present invention.

The TVCT is a table including the property of virtual channels. According to one embodiment of the present invention, the 3DTV service location descriptor can be transmitted in manner of being included in the TVCT.

The TVCT may include a table_id field, a section_syntax_indicator field, a private_indicator field, a section_length field, a transport_stream_id field, a version_number field, a current_next_indicator field, a section_number field, a last_section_number field, a protocol_version field, a num_channels_in_section field, a short_name field, a major_channel_number field, a minor_channel_number field, a modulation_mode field, a carrier_frequency field, a channel_TSID field, a program_number field, an ETM_location field, an access_controlled field, a hidden field, a hide_guide field, a service_type field, a source_id field, a descriptors_length field, an additional_descriptors_length field and/or a CRC_32 field.

The table_id field indicates a type of a table section. For instance, in order to indicate the TVCT, its value may be '0*C8'.

The section_syntax_indicator field is configured with 1 bit and its value is fixed to '1'.

The private_indicator field is set to '1'.

The section_length field consists of 12 bits and first two bits are corresponding to '00'. This field indicates the number of bytes of a section and indicates a length from the right after this field to a CRC.

The transport_stream_id field is configured with 16 bits and it is a MPEG-2 transport stream (TS) ID. It is possible to distinguish from a different TVCT by this field.

The version_number field indicates a version of a virtual channel. A version value increases by '1' on every change in a VCT. If the version value reaches '31', the next version value becomes '0'. The value of this field may be a same value of the same field of the MGT.

The current_next_indicator field is configured with 1 bit. In case that the VCT is currently applicable, the value is set to '1'. If the value is set to '0', it means that the VCT is not applicable yet and the next table is valid.

The section_number field identified the number of section. The value of the first section of the TVCT is '0*00' and increases by '1' on every additional section.

The last_section_number field means the number of the last section. In particular, it means the number of section having a highest section_number in the total of the TVCT.

The protocol_version field plays a role of permitting a kind of table different from the table defined by the current protocol in the future. '0' is the only valid value in the current protocol. The value except '0' shall be used in a later version for a structurally different table.

The num_channels_in_section field indicates the number of virtual channel in the VCT section. Its value is restricted by the length of a section.

The short_name field indicates the name of a virtual channel.

The major_channel_number field indicates a major channel number of a virtual channel defined in a corresponding order in for statement. Each of the virtual channels consists of a major channel number and a minor channel number. The major channel number plays a role of a reference number to a corresponding virtual channel for a user together with the minor channel number. For instance, the major channel number has values ranging from 1 to 99 and a pair of major/minor channel numbers does not have a duplicated value in the TVCT.

The minor_channel_number field has values ranging from 0 to 999. The minor channel number operates as a two-part channel number together with the major channel number. For instance, in case that a service type is either ATSC_digital_television or ATSC_audio_only, the minor channel number has values ranging from 1 to 99. A pair of major/minor channel numbers does not have a duplicated value in the TVCT.

The modulation_mode field indicates a modulation mode of a transport carrier, which is related to a corresponding virtual channel.

The carrier_frequency field may indicate a carrier frequency.

The channel_TSID field has values ranging from '0*0000' to '0*FFFF' and it is an MPEG-2 TSID, which is related to a TS delivering MPEG-2 program referenced by this virtual channel.

The program_number field attaches a virtual channel defined in the TVCT to MPEG-2 program association and TS program map table.

The ETM_location field indicates existence and location of an extended text message (ETM).

The access_controlled field is a flag field. If the flag is '1', it is able to indicate that an access of an event related to a corresponding virtual channel is restricted. If the flag is '0', it indicates that the access is not restricted.

The hidden field is a flag field. If a flag is '1', although a corresponding number is directly inputted by a user, an access is not permitted. A hidden virtual channel is skipped in case that a user surfs channels and can be seen as it is not defined.

The hide_guide field is a flag field. If it is set to '0' for a hidden channel, a virtual channel and an event of the hidden channel can be seen in EPG display. If a hidden bit is not set, this field is ignored. Hence, non-hidden channel and its event belong to the EPG display irrespective of the state of a hide_guide bit.

The service_type field checks a service type delivered by a corresponding virtual channel.

The source_id field checks a programming source related to a virtual channel. In this case, a source may be one of the selected groups consisting of a video, a text, data, or an audio programming. The source id '0' is a reserved value and values ranging from '0*0001' to '0*0FFF' have a sole value in the TS, which delivers the VCT. And, values ranging from '0*1000' to '0*FFFF' have a sole value in a region level.

The descriptor_length field expresses a length of a descriptor, which follows for a corresponding virtual channel, as a byte unit.

A descriptor is not included or more than one descriptor can be included in descriptor ( ).

The additional_descriptors_length field expresses a total length of following VCT descriptor list as a byte unit.

The CRC_32 field indicates a CRC value making a register in a decoder to be zero output.

The present invention transmits the TVCT in a manner of including a 3DTV service location descriptor and may be then able to signal a consistent primary video data, a secondary video data and/or a filtering information etc. for a specific service. In this case, since the service needs not to update a corresponding information according to time and may be able to maintain its service coherently, thereby having an advantageous effect in terms of data transmission efficiency.

According to one embodiment of the present invention, it is able to identify that a broadcasting provided by the present virtual channel is a 3D service via the service_type field. For instance, if the service_type field is set to '0*11', a broadcasting receiver may be able to recognize that a broadcasting service via the present channel is a 3D service.

According to one embodiment of the present invention, a method of reconfiguring, which is reconfigured by a receiver, a 3D video using a primary and a secondary video data in a manner of using a 3DTV service location descriptor is as follows.

A broadcasting receiver obtains stereo format information from the 3DTV service location descriptor and then performs a half resizing for a primary video using filter information for the primary video element. The broadcasting receiver reconfigures a 3D video by combining the resized primary video with a received secondary video. In this case, it is able to determine a combination method of the primary video and the secondary video using the stereo format information. Later, the broadcasting receiver may be able to perform a format conversion and the like according to a display type of the receiver.

According to a different embodiment of the present invention, a method of reconfiguring, which is reconfigured by a receiver, a 3D video using a primary and a secondary video data in a manner of using a 3DTV service location descriptor is as follows.

A broadcasting receiver obtains stereo format information from the 3DTV service location descriptor and then performs a doubling for a secondary video using filter information for the secondary video element. In this case, the doubling may mean that a video of half resolution is changed to a video of full resolution.

The broadcasting receiver reconfigures a 3D video by combining the doubled secondary video with a received primary video using the stereo format information. Later, the broadcasting receiver may be able to perform a format conversion and the like according to a display type of the receiver.

According to one embodiment of the present invention, a method of processing, which is processed by a broadcasting receiver, a primary video element and/or a secondary video element is as follows.

The broadcasting receiver identifies whether a 3DTV service is provided in a corresponding virtual channel using the service_type field of the TVCT. If the service_type field indicates that the 3D broadcasting service is provided, the broadcasting receiver receives elementary_PID information of the primary video element using a service location descriptor or a 3DTV service location descriptor.

The broadcasting receiver obtains elementary_PID information of the secondary video element from the 3DTV service location descriptor.

The broadcasting receiver identifies the information on the stereo configuration information for a primary and/or a secondary video element, left/right arrangement and resizing using the information included in the 3DTV service location descriptor.

In case that a broadcasting service is watched in the broadcasting receiver in 2D mode, the broadcasting receiver should decode & display a stream corresponding to the elementary_PID information of the primary video element only.

In case that a broadcasting service is watched in the broadcasting receiver in 3D mode, the broadcasting receiver simultaneously decodes a stream corresponding to the elementary_PID information of the primary video element and the elementary_PID information of the secondary video element.

The broadcasting receiver shows a 3D screen to a viewer in a manner of controlling format conversion and output of a primary and/or a secondary video stream using the stereo configuration information and the like.

FIG. 4 is a diagram for showing a 3DTV service location descriptor according to a different embodiment of the present invention.

The 3DTV service location descriptor according to a different embodiment of the present invention may include a descriptor_tag field, a descriptor_length field, a left_right_view field, a primary_video_flag field, a resolution_type field, a stereo_format_type field, a filter_type field, a number_horizontal_taps field, a hor_coefficient_den field, a hor_coefficient_num field, a number_vertical_taps field, a ver_coefficient_den field and/or a ver_coefficient_num field.

Since the information indicated by each of the fields is similar to the information of the field having an identical name depicted in FIG. 2, it intends to be replaced with the aforementioned description.

According to a different embodiment of the present invention, the 3DTV service location descriptor can be included in a program map table (PMT) and may be able to signal the information on each of the elements configuring a 3D broadcasting program.

FIG. 5 is a diagram for showing a location of 3DTV service location descriptor included in a program map table (PMT) according to one embodiment of the present invention.

The program map table (PMT) according to the present invention includes the following.

The program map table (PMT) may includes a table_id field, a section_syntax_indicator field, a section_length field, a program_number field, a version_number field, a current_next_indicator field, a section_number field, a last_section_number field, a PCR_PID field, a program_info_length field, a stream_type field, an elementary_PID field, an ES_info_length field, and/or a CRC_32 field.

The table_id field is 8 bit field and can be set to a value of '0*02' to indicate TS_program_map_section.

The section_syntax_indicator field is 1 bit field and is set to '1'.

The section_length field consists of 12 bits and first two bits are corresponding to '00'. This field indicates the number of bytes of a section and indicates a length from the right after this field to a CRC.

The program_number field consists of 16 bits. This field indicates a program to which the program_map_PID is applicable. One program definition is transmitted by one TS_program_map_section only.

The version_number field indicates a version of a virtual channel. A version value increases by '1' on every change in a VCT. If the version value reaches '31', the next version value becomes '0'. The value of this field may be a same value of the same field of the MGT.

The current_next_indicator field consists of 1 bit. In case that the VCT is currently applicable, the value is set to '1'. If the value is set to '0', it means that the VCT is not applicable yet and the next table is valid.

The section_number field identifies the number of section. For instance, the value of the present field for the PMT is set to '0*00'.

The last_section_number field identifies the number of the last section. For instance, the value of the present field for the PMT is set to '0*00'.

The PCR_PID field consists of 13 bits. This field means a PID of TS including a PCR field, which is valid for a program mentioned by a program number.

The program_info_length field may consist of 12 bits and first two bits are corresponding to '00' value. The rest of 10 bits shows a descriptor, which follows this field, as the number of bytes.

The stream_type field may consist of 8 bits and indicate a type of program element transmitted by a packet having a PID value of a basic PID.

The elementary_PID field may consist of 13 bits and indicate a PID of TS including a related program element.

The ES_info_length field may consist of 12 bits and first two bits are corresponding to '00'. The rest of 10 bits shows a descriptor of a related program element, which follows this field, as the number of bytes.

According to embodiment of the present invention, a descriptor, which follows the ES_info_length field, may be a 3DTV service location descriptor.

The CRC_32 field indicates a CRC value making a register in a decoder to be zero output.

By transmitting PMT in a manner of inserting a 3DTV service location descriptor in the PMT, it may be able to signal a primary video data, a secondary video data and/or filtering information, etc. according to the element configuring a 3D broadcasting program.

According to one embodiment of the present invention, a method of reconfiguring, which is reconfigured by a broadcasting receiver, a 3D video using a primary and a secondary video data in a manner of using a 3DTV service location descriptor is as follows.

The broadcasting receiver identifies whether a corresponding stream is a primary or a secondary video stream using the stream_type of the PMT and a 3DTV service location descriptor corresponding to each elementary stream. In this case, it may be able to know whether a corresponding program provides a 3DTV service via the existence of the 3DTV service location descriptor.

The broadcasting receiver identifies PID_P (packet identifier for primary video) corresponding to a primary video and PID_S (packet identifier for secondary video) corresponding to a secondary video.

The broadcasting receiver obtains the information on the stereo configuration for a primary and/or a secondary video stream, left/right arrangement and information on resizing via the 3DTV service location descriptor.

The broadcasting receiver performs a mapping to the information provided by the TVCT using the program_number field. In this process, the broadcasting receiver may be able to know the virtual channel on which this program is carried.

In case that a broadcasting service is watched in the broadcasting receiver in 2D mode, the broadcasting receiver decodes and displays a stream corresponding to the PID_P only.

In case that a broadcasting service is watched in the broadcasting receiver in 3D mode, the broadcasting receiver simultaneously decodes a stream corresponding to the PID_P and the PID_S.

The broadcasting receiver shows a 3D screen to a viewer in a manner of controlling the format conversion and output of a primary and/or a secondary video stream using the information obtained through the 3DTV service location descriptor.

FIG. 6 is a diagram for showing a 3DTV service location descriptor according to a different embodiment of the present invention.

The 3DTV service location descriptor according to embodiment of the present invention may include a descriptor_tag field, a number_elements field, a component_tag field, a left_right_view field, a primary_video_flag field, a stream_type field, a resolution_type field, a stereo_format_type field, a filter_type field, a number_horizontal_taps field, a hor_coefficient_den field, a hor_coefficient_num field, a number_vertical_taps field, a ver_coefficient_den field and/or a ver_coefficient_num field.

The component_tag field identifies a component stream related to the present descriptor.

Since the information indicated by each of the fields is similar to the information of the field having an identical name depicted in FIG. 2, it intends to be replaced with the aforementioned description.

According to a different embodiment of the present invention, a 3DTV service location descriptor can be included in a service description table (SDT) and may be able to signal the information on each element configuring a 3D broadcasting program.

As a different example, the stream_type field may be replaced by a stream_content and a component_type field in a component descriptor capable of being included in the STD. In this case, the stream_type field can be omitted in the 3DTV service location descriptor. And, a component_tag can be used to indicate a connection relationship between the component descriptor and the ES in an ES_loop of the PMT. A connection relationship between the component descriptor in the STD and the 3DTV service location descriptor may be indicated as the ES_loop descriptor of the PMT in a manner of having an identical value in the component_tag field of a stream identifier descriptor.

And, information on a plurality of elements can be included in the 3DTV service location descriptor via a loop. Yet, it may also be able to configure a descriptor to include information on a single element only by eliminating the loop. In this case, identical 3D video configuration information can be applied to the elements configuring a 3D broadcasting service.

FIG. 7 a diagram for showing a location of 3DTV service location descriptor included in a service description table (SDT) according to one embodiment of the present invention.

The service description table is a table indicating the services included in a specific transport stream in DVB-SI.

According to one embodiment of the present invention, the service description table may include a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_length field and/or a CRC_32 field.

The table_id field is an identifier identifying a table. For instance, a specific value of the table_id field indicates that this section belongs to a service description table.

The section_syntax_indicator field is 1 bit field and is set to '1'.

First two bits of the section_length field are set to '00'. This field indicates the number of bytes of a section from right after this field to CRC.

The transport_stream_id field plays a label role of distinguishing a transport stream (TS).

The version_number field indicates a version number of a sub_table. A version number increases by '1' on every change in the sub_table.

In case that the sub_table is currently applicable, the current_next_indicator field is set to '1'. If it is set to '0', it means that the sub_table is not applicable yet and the next table is valid.

The section_number field indicates the number of a section. First section may have a value of '0*00'. The value increases by '1' on every additional section having a same table_id, transport_stream_id, and original_network_id.

The last_section_number field indicates the number of the last section (in particular, the highest section_number) of a corresponding sub_table, which includes this section as a part.

The original_network_id field is a label for checking a network_id of a transport system.

The service_id field plays a label role of distinguishing a service from a different service included in the TS. This field is same with the program_number field of the program_map_section.

If the EIT_schedule_flag field is set to '1', it may indicate that EIT schedule information for a corresponding service is included in current TS. If the field is set to '0', it may indicate that the EIT schedule information is not included in the TS.

If the EIT_present_following_flag field is set to '1', it may indicate that EIT_present_following information for a corresponding service is included in current TS. If the field is set to '0', it may indicate that the EIT_present_following information is not included in the TS.

The running_status field indicates a service status.

If the free_CA_mode field is set to '0', it indicates that all element streams of a corresponding service are not scrambled. If the field is set to '0', it means that one or more streams are controlled by a CA system.

The descriptor_loop_length field shows a total length of a following descriptor as byte unit.

According to a different embodiment of the present invention, 3DTV service location descriptor can be included in a descriptor area, which follows the descriptor_loop_length field.

The CRC_32 field indicates a CRC value making a register in a decoder to be zero output.

According to one embodiment of the present invention, the descriptor area, which follows the descriptor_loop_length field, may indicate that the present service is a 3D broadcasting service via the service_type field included in the service descriptor of the DVB SI.

FIG. 8 is a diagram for showing a description in accordance with a value of service_type field according to one embodiment of the present invention.

For instance, in case that the service_type field has a value of '0*12', it may be able to indicate that a service described by the present service description table is a 3D broadcasting service.

The contents, which are defined according to the value of the service_type field, are replaced by the description depicted in FIG. 8.

The service_type value can be included in a descriptor loop of the service description table (STD) in a manner of being included in the service descriptor. In order to secure the compatibility with a legacy receiver only supporting a 2D video service, a service configuration can be done as follows.

According to one embodiment of the present invention, a 2D video service and a 3D video service are defined, respectively. Yet, the streams, which configure two video services, are used in a manner of being shared. In this case, a service type for the 3D video service may use a new value by which the present invention proposed. The 2D service and the 3D service share a primary video stream, which configures a service. The 3D video service may be able to provide a 3DTV broadcasting service of half or full resolution by additionally including a secondary video stream.

According to a different embodiment of the present invention, a method of configuring a service with one service without configuring a separate service is possible. In this case, since a separate value is allocated to the secondary video stream, a conventional 2D video receiver is ignored because the conventional 2D video receiver is unable to recognize the separate value and then it is possible to provide a full resolution service with a primary video stream only without a problem. It is possible for a 3D video service supportive of receiver to provide a service of a half or full resolution in a manner of recognizing the secondary video stream and combining it with the primary video stream.

FIG. 9 is a diagram for showing a component descriptor according to one embodiment of the present invention.

According to one embodiment of the present invention, the component descriptor may include a descriptor_tag field, a descriptor_length field, a stream_content field, a component_type field, a component_tag field, an ISO 639-2[3]_language_code field and/or a text_char field.

The descriptor_tag field plays a role of identifying a descriptor to which this field belongs.

The descriptor_length field shows a length of data, which belongs to this field following present descriptor, as bytes.

The stream_content field indicates the type of video, audio, or data included in a stream.

The component_type field indicates the type of video, audio, or data component.

The component_tag field is a field having a same value with the component_tag field of a stream identifier descriptor.

The ISO 639-2[3]_language_code field identifies a language of a component or the language of a character descriptor included in this descriptor.

The text_char field identifies a character descriptor of a component stream.

The present descriptor can be included in the service description table (SDT) of the DVB system and/or an event information table.

FIG. 10 is a diagram for showing a description of stream_content and component_type according to one embodiment of the present invention.

The stream_content indicates a kind of stream. It can be defined as '0*01' in case of MPEG-2 video, '0*05' in case of H.264 video. A component type in a stream can be defined as shown in FIG. 10. A pre-defined value can be utilized for a primary video stream for a 3D service. The component type corresponding to a secondary video stream for a 3D service can be additionally defined as shown in FIG. 10.

For instance, in case that a value of the stream_content is '0*01' and the value of the component_type is '0*13', it may indicate that the secondary video stream for the 3D service is a video, which is coded with MPEG-2, a half resolution, and displaying 25 frames per second.

For instance, in case that a value of the stream_content is '0*01' and the value of the component_type is '0*14', it may indicate that the secondary video stream for the 3D service is a video, which is coded with MPEG-2, a half resolution, and displaying 30 frames per second.

For instance, in case that a value of the stream_content is '0*05' and the value of the component_type is '0*13', it may indicate that the secondary video stream for the 3D service is a video, which is coded with AVC/H.264, a half resolution, and displaying 25 frames per second.

For instance, in case that a value of the stream_content is '0*05' and the value of the component_type is '0*14', it may indicate that the secondary video stream for the 3D service is a video, which is coded with AVC/H.264, a half resolution, and displaying 30 frames per second.

According to one embodiment of the present invention, a method of reconfiguring, which is reconfigured by a receiver, a 3D video using a primary and a secondary video data in a manner of using a 3DTV service location descriptor as a PMT is as follows.

A broadcasting receiver identifies a 3D video stream using a SDT and may be able to receive detail information on each 3D video stream from the descriptor included in the PMT.

The broadcasting receiver identifies whether a 3DTV service is provided in a corresponding channel using a service_type field of a service descriptor of the SDT. Or, the broadcasting receiver may be able to identify whether the 3DTV service is provided in a manner of checking whether there is a stream for 3D service in the component of ES, which is signaled via a component descriptor of the SDT.

The broadcasting receiver identifies whether there is a stream corresponding to a primary video among an elementary stream, which is signaled by a component descriptor of the SDT (for instance, a video stream having a full resolution may become the primary video stream). By using the stream_content and the component_type, it may be able to know that the corresponding elementary stream is corresponding to the primary video of a 3D broadcasting service. In this case, it may be able to identify the primary video using component_tag_P information.

The broadcasting receiver identifies whether there is a stream corresponding to a secondary video among an elementary stream, which is signaled by a component descriptor of the SDT (for instance, a video stream having a half resolution may become the secondary video stream). By using the stream_content and the component_type, it may be able to know that the corresponding elementary stream is corresponding to the secondary video of 3D broadcasting service. In this case, it may be able to identify the secondary video using component_tag_P information.

The broadcasting receiver performs a parsing in a manner of finding out a program_number field corresponding to the service_id field of the SDT.

The broadcasting receiver receives elementary PID information of a 3D primary video component in a manner of finding out that a value of component_tag of stream identifier descriptor of ES descriptor loop is a component_tag_P among the elementary streams of the PMT (for instance, a corresponding elementary PID can be represented as a PID_P).

The broadcasting receiver receives elementary PID information of a 3D secondary video component in a manner of finding out that a value of component_tag of stream identifier descriptor of ES descriptor loop is a component_tag_S among the elementary streams of the PMT (for instance, a corresponding elementary PID can be represented as a PID_S).

The broadcasting receiver may be able to obtain the information on stereo configuration information for a primary and/or a secondary video element, left/right arrangement, and resizing via the 3DTV service location descriptor, which is added to the PID_S identified in the ES loop of the PMT.

In case that a broadcasting service is watched in the broadcasting receiver in 2D mode, the broadcasting receiver decodes and displays a stream corresponding to the PID_P only.

In case that a broadcasting service is watched in the broadcasting receiver in 3D mode, the broadcasting receiver simultaneously decodes a stream corresponding to the PID_P and the PID_S.

The broadcasting receiver controls a format conversion and output of a primary and/or a secondary video stream using the information obtained via the 3DTV service location descriptor and may be then able to shows a 3D screen to a viewer.

In the following description, a process of obtaining a PID of a 3D primary and/or a secondary video stream from a component descriptor of STD is described.

According to a different embodiment of the present invention, a method of reconfiguring, which is reconfigured by a receiver, a 3D video using a primary and a secondary video data in a manner of using a 3DTV service location descriptor as SDT is as follows.

The broadcasting receiver identifies whether a 3DTV service is provided in a corresponding service using a service_type field of a service descriptor of the SDT. Or, the receiver may be able to know whether the corresponding service provides the 3DTV service by the existence of the 3DTV service location descriptor.

If the 3D broadcasting service is provided, the broadcasting receiver receives component_tag information of the 3D primary video using the 3DTV service location descriptor. (For instance, the received component_tag information may become a component_tag_P.)

The broadcasting receiver receives component_tag information of a 3D secondary video using the 3DTV service location descriptor. (For instance, the received component_tag information may become a component_tag_S.)

The broadcasting receiver performs a parsing in a manner of finding out a program_number field corresponding to the service_id field of the SDT.

The broadcasting receiver receives elementary PID information of a 3D primary video component in a manner of finding out that a value of component_tag of stream identifier descriptor of ES descriptor loop is a component_tag_P among the elementary streams of the PMT (for instance, a received elementary PID information may become a PID_P).

The broadcasting receiver receives elementary PID information of a 3D secondary video component in a manner of finding out that a value of component_tag of stream identifier descriptor of ES descriptor loop is a component_tag_S among the elementary streams of the PMT (for instance, a received elementary PID information may become a PID_S).

The broadcasting receiver may be able to obtain the information on stereo configuration information for a primary and/or a secondary video element, left/right arrangement, and resizing using the 3DTV service location descriptor, which is obtained via the SDT.

In case that a broadcasting service is watched in the broadcasting receiver in 2D mode, the broadcasting receiver decodes and displays a stream corresponding to the PID_P only.

In case that a broadcasting service is watched in the broadcasting receiver in 3D mode, the broadcasting receiver simultaneously decodes a stream corresponding to the PID_P and the PID_S.

The broadcasting receiver controls a format conversion and output of a primary and/or a secondary video stream using the information obtained via the 3DTV service location descriptor and may be then able to shows a 3D screen to a viewer.

Various embodiments are available for a method of formatting and outputting a decoded primary and/or a secondary video. For instance, the method includes a case of performing a format in a manner of resizing to output a spatially multiplexed format (side-by-side, top bottom, line interlacing etc.) via a received information and a case of performing a format in a manner of resizing to output a temporally multiplexed format (frame sequential, field sequential etc.) via a received information according to the capability/type of the display of the broadcasting receiver. And, the broadcasting receiver may be able to perform a frame rate conversion to coordinate the frame rate supported by the display.

Figure 11:
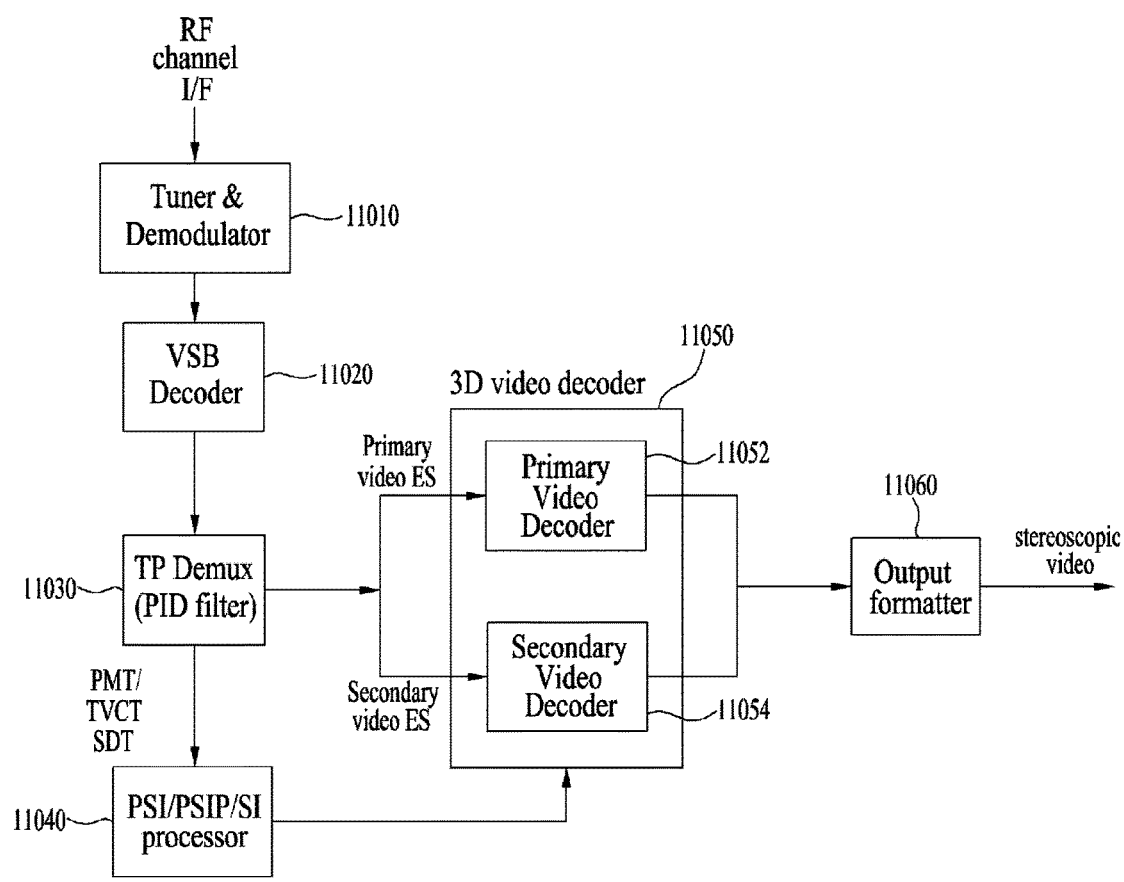
FIG. 11 is a diagram for showing a structure of a broadcasting receiver according to one embodiment of the present invention.

FIG. 11 is a diagram for showing a structure of a broadcasting receiver according to one embodiment of the present invention.

According to one embodiment of the present invention, the broadcasting receiver may include a tuner and demodulator 11010, a VSB decoder 11020, a TP demultiplexor 11030, a system information processor (PSI/PISP/SI processor) 11040, a 3D video decoder 11050 and/or an output formatter 11060. The 3D video decoder may include a primary video decoder 11052 and/or a secondary video decoder 11054.

The broadcasting receiver receives a broadcasting signal via the tuner and demodulator 11010 and/or the VSB decoder 11020. The VSB decoder 11020 may be interpreted as an OFDM decoder and the like irrespective of its name.

The TP demultiplexor 11030 outputs a video data, a system information and the like in a manner of extracting from a broadcasting signal through a filtering. The system information may include a PMT, a TVCT and/or a SDT.

The system information processor 11040 receives a system information and obtains 3D video composition information in a manner of parsing the received system information. The broadcasting receiver determines whether a 3D broadcasting service is provided via the system information processor 11040 and enables the TS demultiplexor 11030 to output a primary and a secondary video data according to whether the 3D broadcasting service is provided.

The 3D video decoder 11050 decodes a primary and a secondary video data according to 3D video composition information.

The output formatter 11050 processes a primary and a secondary video data according to 3D composition information and then outputs 3D video data. The output formatter 11060 may be able to perform such a video data processing as a resizing, a video formatting, a frame rate conversion via a filtering for at least one of a primary and a secondary video data according to the 3D composition information.

The output formatter 11060 may be able to perform the resizing according to a resizing information (or a filter information) included in the received 3D video composition information. The resizing information may include information on a kind of filter. In this case, information on a property of the filter and the like corresponding to the kind of the filter may be stored in the output formatter 11060 or a storage medium not depicted.

Figure 12:
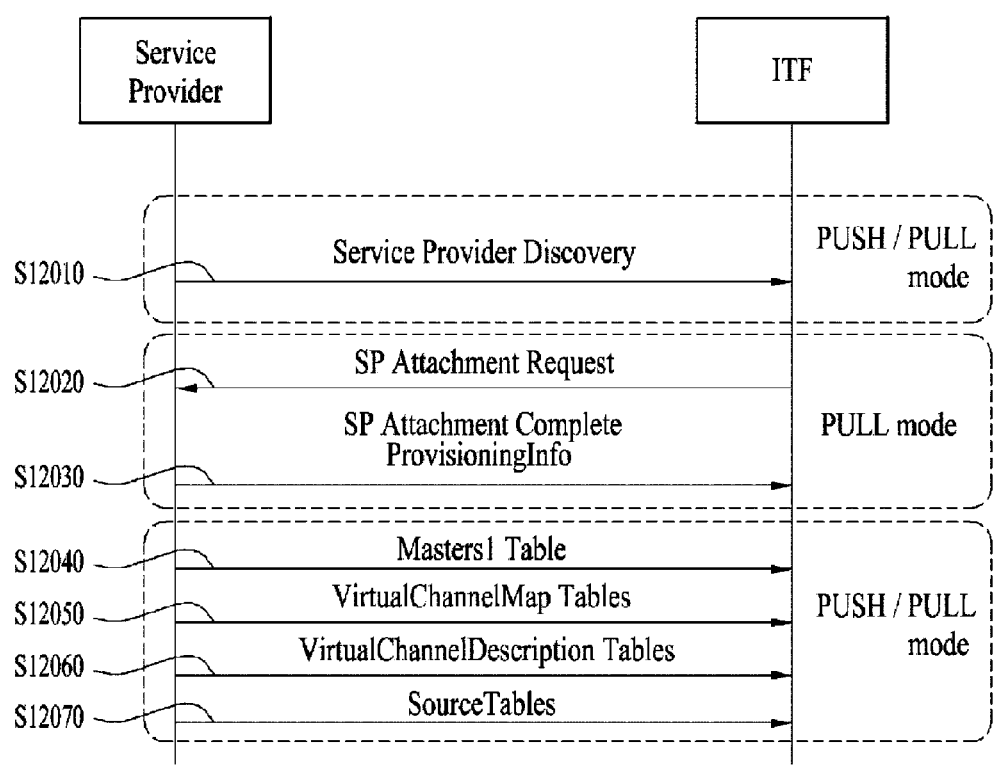
FIG. 12 is a flowchart for showing a 3D service acquisition process in an IPTV according to one embodiment of the present invention.

FIG. 12 is a flowchart for showing a 3D service acquisition process in an IPTV according to one embodiment of the present invention.

ITF (IPTV terminal function) is provided with information for a service provider discovery from a service provider in push/pull mode [S12010]. The service provider discovery is a process of searching for a server providing information on the service provided by service providers by the IPTV providing service providers. For instance, the service provider discovery provides a service information server according to a service provider in the following method. In particular, a receiver searches for an address list capable of receiving information (SP discovery information) on an SD server (service discovery server) in the following method.

As one embodiment, a receiver receives SP (service provider) discovery information from an automatically or a manually pre-set address. In this case, a user may be able to receive the SP discovery information that the user wants in a manner of receiving a corresponding information from the pre-set address in the ITF or in a manner of manually setting a specific address by the user.

As a different embodiment, the receiver may be able to perform a DHCP based SP discovery. In particular, the receiver may be able to obtain SP discovery information using a DHCP option.

As a further different embodiment, the receiver may be able to perform a DNS SRV based SP discovery. In particular, the receiver may be able to obtain SP discovery information in a manner of throwing a query using DNS SRV mechanism.

The receiver accesses a server of the address obtained from the above mentioned method and receives information consisted of a service provider discovery record including information necessary for a service discovery of a SP (service provider). The receiver proceeds a service searching step via the information consisted of the service provider discovery record. It may be able to provide data, which is related to the service provider discovery, in both modes, i.e., a push mode and a pull mode. The receiver accesses an SP attachment server of an access address (e.g., an address designated as SPAttachmentLocator) of a service provider based on the SP discovery record and then performs an ITF registration process (service attachment process) [S12020]. In this case, the information delivered from the ITF to the server may be delivered in a form of ITFRegistrationInputType record. The ITF may be able to perform a service attachment in a manner of providing the information in a form of query term of HTTP GET method.

As one embodiment, after performing a separate authentication process by accessing an authentication service server selectively designated as a SPAuthenticationLocator of the SP, the receiver may perform a service attachment. In this case, the receiver may be able to perform the authentication in a manner of transmitting ITF information having a form similar to the case of the service attachment to the server.

The receiver may be able to receive data having a form of ProvisioningInfoTable from a service provider [S12030]. This procedure may be omitted.

The receiver provides data to the server in a manner of including an ID of the receiver and location information in the service attachment procedure such as ITFRegistrationInputType record and the like [S12040]. The service attachment server may be able to specify a service to which the receiver has subscribed based on the information provided by the receiver. Based on this, the service attachment server may be able to provide an address capable of obtaining service information, which should be received by the receiver, in a form of the ProvisioningInfoTable. For instance, it is available to use this address as an access information of MasterSI table. This method has an effect in enabling a service to be provided in a manner of being customized according to a subscriber.

The receiver may be able to receive a virtualchannelmap table [S12050], a virtualchanneldescription table [S12060] and/or a sourcetable [S12070] based on the information received from the service provider.

The virtualchannelmap table provides a Master SI table record and a service list of a package form, which manage an access information and version for the virtualchannelmap. The Virtualchanneldescription table includes detail information on each channel. The source table includes access information capable of accessing a real service. The virtualchannelmap table, the virtualchanneldescription table and the sourcetable can be classified as service information. The aforementioned informations of the descriptor may further be included in the service information. Yet, in this case, a form of the information can be modified according to a service information scheme of the IPTV.

Figure 13:
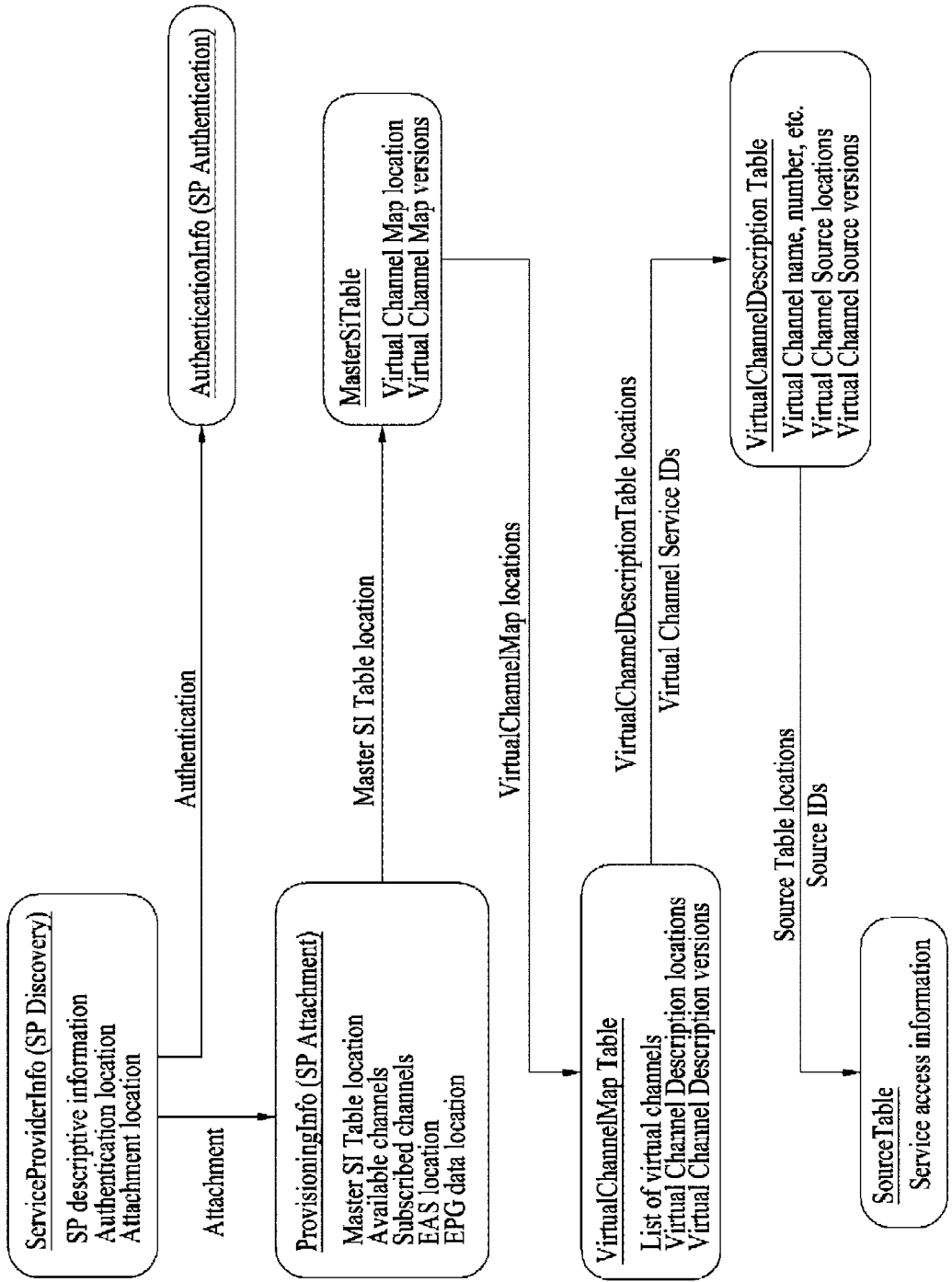
FIG. 13 is a diagram for showing a structure of service information (SI) table for an IPTV according to one embodiment of the present invention.

FIG. 13 is a diagram for showing a structure of service information (SI) table for an IPTV according to one embodiment of the present invention.

According to FIG. 13, service provider discovery, attachment metadata components, services discovery metadata components and the relationship among them are depicted. The receiver may be able to process a received data according to the procedures represented as arrows depicted in FIG. 13.

The serviceproviderinfo includes a SP descriptive information, which is the information related to a service provider, an authentication location, which is the information on a location providing the information related to an authentication, an attachment information, which is the information related to an attachment location.

The receiver may be able to perform an authentication related to a service provider using authentication location information.

The receiver may be able to access a server capable of receiving a ProvisioningInfo using the information included in the attachment location. The ProvisioningInfo may include a Master SI Table location including a server address capable of receiving Master SI Table, an Available channel including information on the channel capable of being provided to a viewer, a Subscribed channel including information on the subscribed channel, an EAS (emergency alert system) location including information related to an emergency situation alert and/or an EPG data location including location information related to an EPG (electronic program guide). In particular, the receiver may be able to access an address capable of receiving the Master SI Table using the Master SI Table location information.

Master SI Table Record includes a location information capable of receiving each VirtualChannelMap and version information of each of the VirtualChannelMaps.

The VirtualChannelMap is identified by a VirtualChannelMapIdentifier and a VirtualChannelMapVersion includes a version information. In case that a certain table is changed among all of the tables, which linked in the direction of arrows from the MasterSITable, the change may lead to the increase of version number of the corresponding table and the increase of version number of all upper tables (up to the MasterSI table). Hence, a change in all SI tables can be identified immediately by monitoring the MasterSITable. For instance, in case that a change occurs in the SourceTable, the change increases a SourceVersion, which is a version of the SourceTable, and may lead to a change of a VirtualChannelDescriptionTable including a reference for the SourceTable. In this manner, a change in a lower table spreads to an upper table and may lead to a change of the MasterSITable in the end.

The Master SI Table may exist uniquely for one service provider. Yet, in case that a service configuration is different according to an area or a subscriber (or group of subscriber), it may be effective to configure a separate Master SI Table Record to provide a customized service according to the each unit. In this case, it may be able to provide a customized service, which fits to the area of a subscriber, subscription information and the like via a service attachment step, using the Master SI Table.

The Master SI Table Record provides a VirtualChannelMap list. The VirtualchannelMap may be identified by the VirtualChannelMapIdentifier. Each VirtualChannelMap may have at least one VirtualChannel and designates a location capable of obtaining detail information on the VirtualChannel. A VirtualChannelDescriptionLocation plays a role of designating a location of a VirtualChannelDescriptionTable, which includes detail channel information.

The VirtualChannelDescriptionTable includes the detail information of the VirtualChannel and may be able to access a location capable of providing corresponding information to the VirtualChannelDescriptionLocation in the VirtualChannelMap.

A VirtualChannelServiceID is included in the VirtualChannelDescriptionTable and plays a role of identifying a service corresponding to the VirtualChanneldescription. The receiver may be able to search for the VirtualChannelDescriptionTable via the VirtualChannelServiceID. In case that a plurality of VirtualChannelDescriptionTables are delivered by a Multicast method, the receiver searches for the VirtualChannelDescriptionTable identified by a specific VirtualChannelServiceID in a manner of joining a corresponding stream and continuously receiving tables.

In case of a Unicast, the receiver may be able to receive a needed VirtualChannelDescriptionTable only in a manner of delivering the VirtualChannelServiceID to a server as a parameter.

The SourceTable provides access information (e.g., an IP address, a port, an AV codec, a transfer protocol and the like) necessary for accessing a real service and/or source information according to a service. Since one source may be utilized for various VirtualChannel services, it may be efficient to provide the source information in a manner of classifying it according to a service.

The MasterSITable, the VirtualChannelMapTable, the VirtualChannelDescriptionTable, and the SourceTable are delivered via logically divided 4 flows and it may be OK irrespective of push or pull method.

Yet, the MasterSITable may be transmitted by the multicast method to manage a version and the receiver may be able to monitor a version change in a manner of receiving a stream transmitting the MasterSITable all the time.

Figure 14:
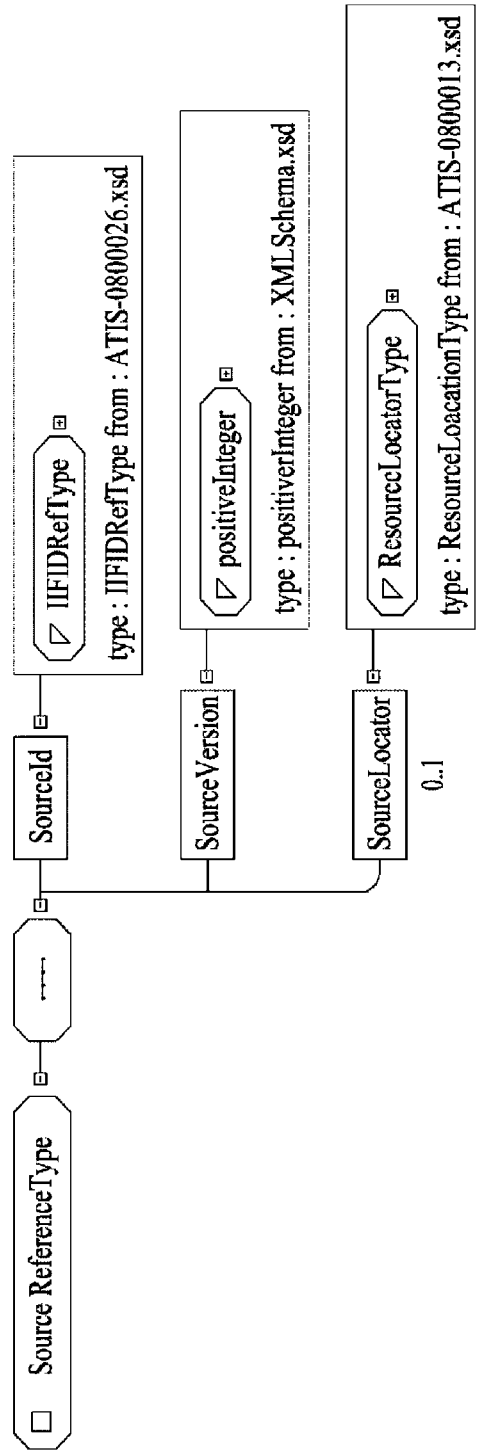
FIG. 14 is a diagram for showing XML schema of SourceReferenceType according to one embodiment of the present invention.

FIG. 14 is a diagram for showing XML schema of SourceReferenceType according to one embodiment of the present invention.

According to one embodiment of the present invention, the XML schema of SourceReferenceType is a structure referring a source element, which includes a media source information of a Virtual Channel Service.

SourceReferenceType may include a SourceId, a SourceVersion and/or a SourceLocator information.

The SourceId is an identifier of referenced Source element.

The SourceVersion is a version of referenced Source element.

The SourceLocator provides a location capable of receiving a Source Table, which includes a referenced Source element. As one embodiment, in case that a DefaultSourceLocator and the present element exist at the same time, the present element overrides the default value.

Figure 15:
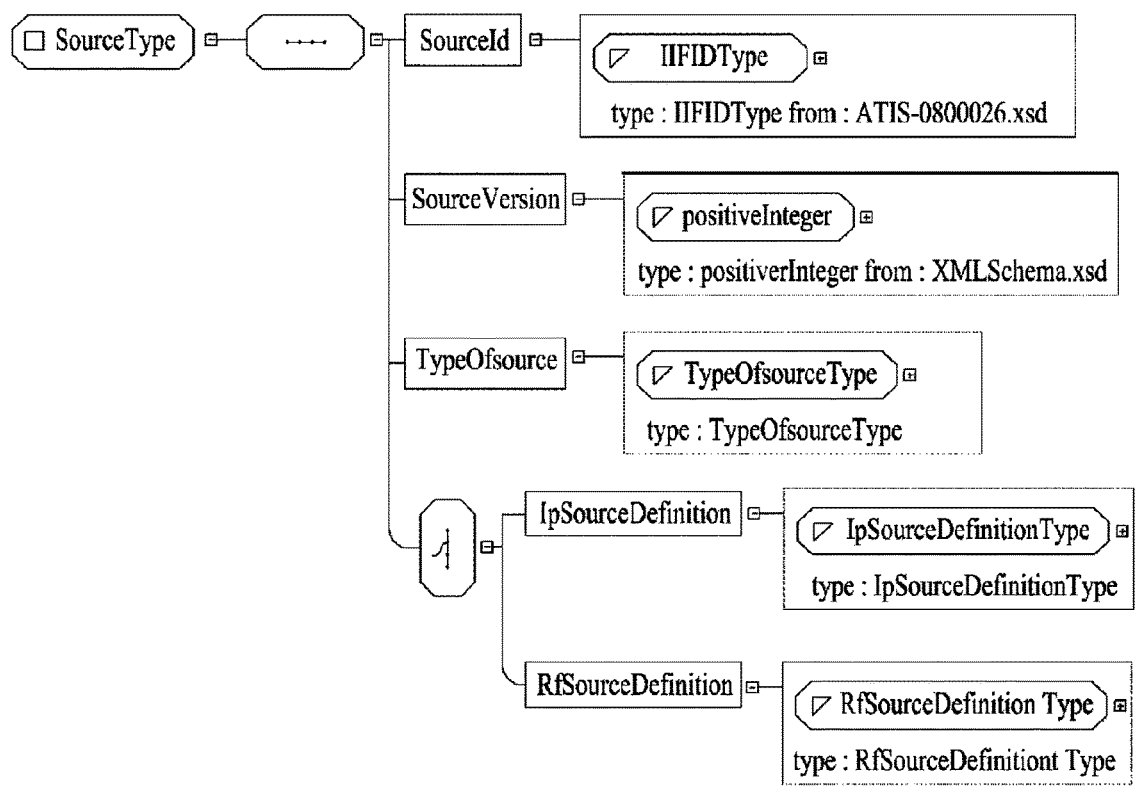
FIG. 15 is a diagram for showing XML schema of SourceType according to one embodiment of the present invention.

FIG. 15 is a diagram for showing XML schema of SourceType according to one embodiment of the present invention.

According to one embodiment of the present invention, the XML schema of SourceType includes information necessary for obtaining a media source of the VirtualChannelService.

The SourceType includes a SourceType, a SourceVersion, a TypeOfSource, an IpSourceDefinition and/or an RfSourceDefinition information.

The SourceId is an identifier of a referenced Source element. As one embodiment, this identifier should be able to uniquely identify the Source element.

The SourceVersion is a version of a referenced Source element. As one embodiment, a version value should increase on every change of the content of the Source element.

The TypeOfSource is a value indicating a characteristic of a corresponding Source. For instance, it may be able to indicate a property of a HD (high definition), a SD (standard definition), a PIP (picture in picture), a Baker and the like.

As one embodiment, the Baker channel is a channel for advertising or publicizing. In case that a corresponding channel is not able to be viewed due to the lack of authority, the Baker channel is automatically selected and plays a role of promoting the corresponding channel and guiding a subscription.

The IpSourceDefinition provides access information of a media source transmitted via an IP network. As one embodiment, the IpSourceDefinition may be able to report a Multicast IP address, a transfer protocol and/or various parameters.

The RfSourceDefinition may be able to provide access information of a media source, which is delivered via a cable TV network.

FIG. 16 is a diagram for showing TypeOfSourceType XML schema expanded to signal information on primary or secondary video for 3D broadcasting service according to one embodiment of the present invention.

For instance, it intends to distinguish a case of a half resolution secondary video source for a 3D broadcasting service in a manner of expanding the TypeOfSource and then adding 'HalfResolution2DSecondaryVideofor3D' type to signal a source information of the half resolution secondary video for the 3D broadcasting service.

As one embodiment, it may be able to expand an IPSourceDefinition and an RFSourceDefinition to signal video composition information in case of configuring a 3D service as follows. Providing information in this step may be similar to the providing video composition information in channel or service unit in case of ATSC or DVB broadcasting. In an IPTV, one service can be configured with various media sources and a plurality of sources can be designated as a flexible structure as mentioned in the foregoing description. Hence, it is possible to provide information by a service unit by providing video composition information in a manner of expanding source level information. In this case, the video composition information may include the information, which is included in a 3DTV service location descriptor.

Figure 17:
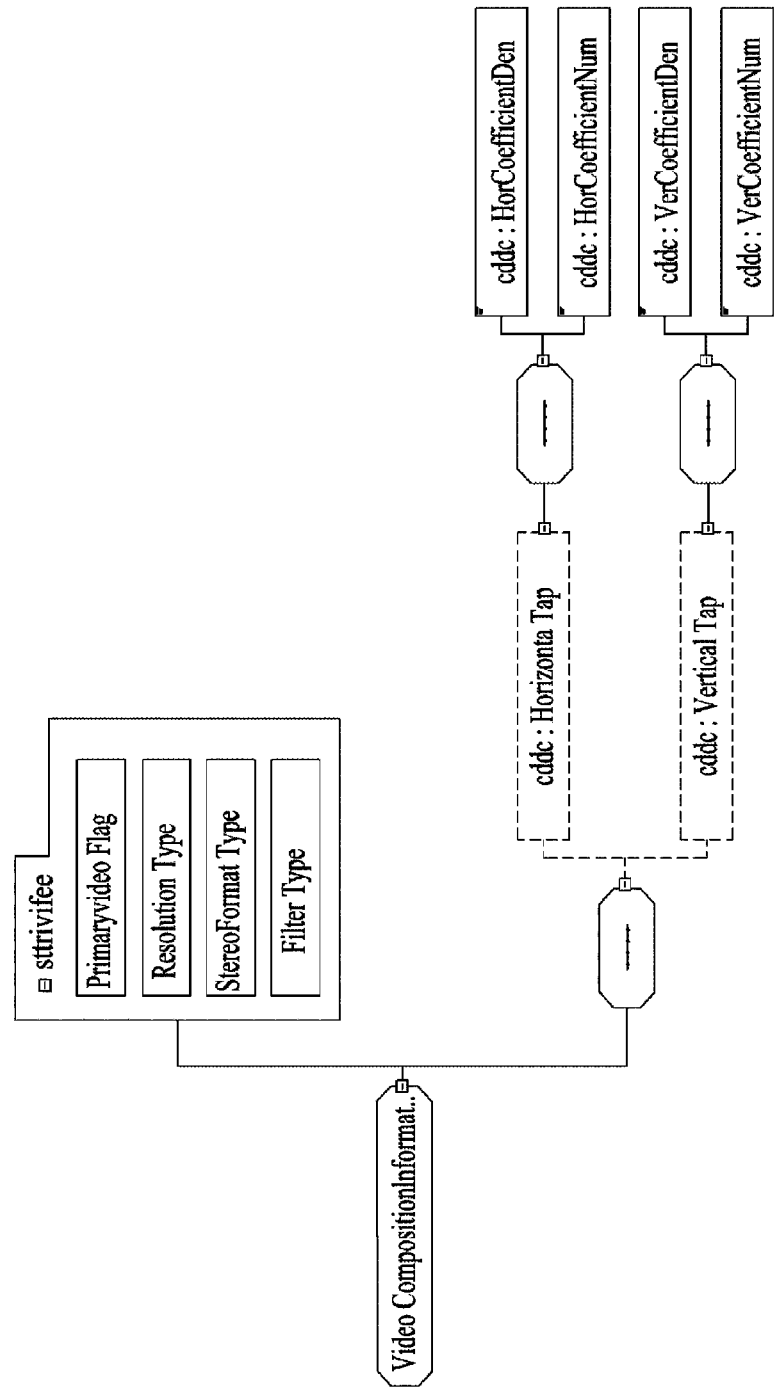
FIG. 17 is a diagram for showing XML schema diagram of VideoCompositionInformationFor3DType to include 3D video composition information according to one embodiment of the present invention.

FIG. 17 is a diagram for showing XML schema diagram of VideoCompositionInformationFor3DType to include 3D video composition information according to one embodiment of the present invention.

In this case, the 3D composition information means the information including the information included in the aforementioned 3DTV service location descriptor. The VideoCompositionInformationFor3DType is a newly defined type to include video composition information. It includes information on a detail method of outputting a 3D video in a manner of combining two 2D videos as mentioned earlier.

According to one embodiment of the present invention, the VideoCompositionInformationFor3DType may include a PrimaryVideoFlag field, a ResolutionType field, a StereoFormatType field, a FilterType field, a HorCoefficientDen field, a HoeCoefficientNum field, a VerCoefficientDen field, and/or a VerCoefficientNum field.

Since the explanation for each of the fields is similar to that of the field having an identical name included in the aforementioned 3DTV service location descriptor, detail description for the fields is replaced by the aforementioned description.

The aforementioned information may be given to both a 2D source and a case of half resolution secondary video for 3D contents.

An IPTV receives 2 streams providing a 2D video of half resolution added to a conventional 2D service, may be able to provide a 3D service in a manner of combining the streams, and may be able to provide each of the streams in a manner of configuring in a source form.

FIG. 18 is a diagram for showing XML schema of VideoCompositionInformationFor3DType to include 3D video composition information according to one embodiment of the present invention.

Since the contents included in the VideoCompositionInformationFor3DType is same with the aforementioned contents, detail description is omitted and replaced with the aforementioned description.

Figure 19:
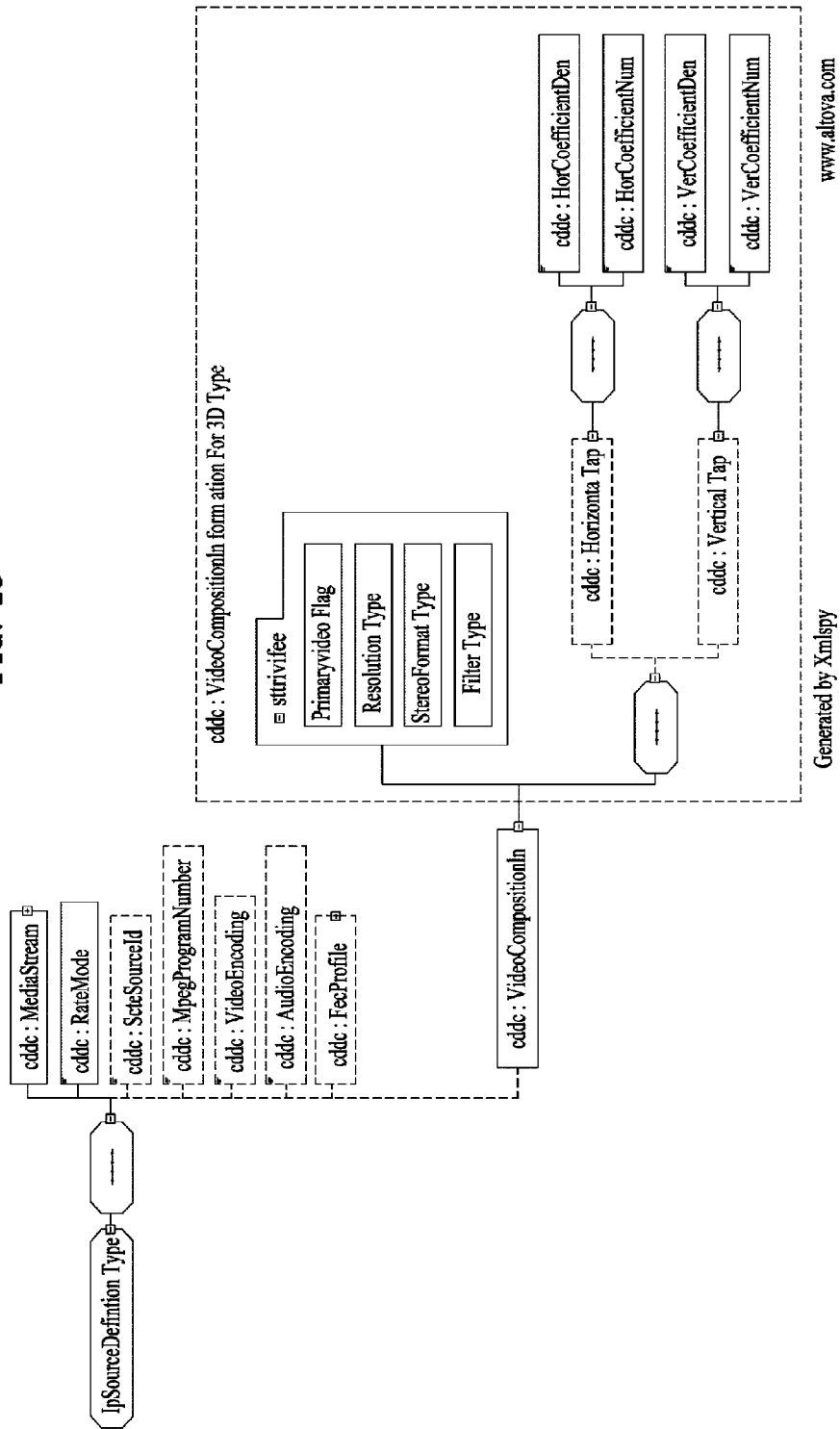
FIG. 19 is a diagram for showing IPSourceDefinitionType, RFSourceDefinition XML schema expanded to include 3D video composition information according to one embodiment of the present invention.

FIG. 19 is a diagram for showing IPSourceDefinitionType, RFSourceDefinition XML schema expanded to include 3D video composition information according to one embodiment of the present invention.

Referring to FIG. 19, in case of outputting a 3D in a manner of adding a VideoCompositionInformationFor3 element, which is an element of the VideoCompositionInformationFor3DType, to the IPSourceDefinitionType, a method of providing an information on composing two 2D videos is proposed.

According to one embodiment of the present invention, the IpSourceDefinitionType may include a MediaStream element, a RateMode element, a ScteSourceId element, an MpegProgramnumber element, a VideoEncoding element, an AudioEncoding element, a FecProfile element and/or a VideoCompositionInformationFor3DType element.

The MediaStream element includes an IP multicast session description for a media stream of this source. This media stream element includes an asBandwidth property. A unit of the asBandwidth can be represented by kilobit per second. An interpretation for the asBandwidth property is corresponding to a maximum bit rate.

The RateMode element includes a programming source rate type. For instance, it may be a constant bit rate (CBR) or a variable bit rate (VBR), The ScteSourceId element may include a Source ID of MPEG-2 TS.

The MpegProgramnumber element may include MPEG Program Number.

The VideoEncoding element indicates a video encoding format of a media source.

The AudioEncoding element may be able to represent a description for an audio coding used for a programming source in a form of an audio MIME type, which is registered in IANA.

The FecProfile element indicates an IP FEC Profile, if it is possible.

The VideoCompositionInformationFor3DType element signals information on a primary and/or a secondary video element. The VideoCompositionInformationFor3DType element may include a PrimaryVideoFlag field, a ResolutionType filed, a StereoFormatType field, a FilterType field, HorCoefficientDen field, a HoeCoefficientNum field, a VerCoefficientDen field, and/or a VerCoefficientNum field. Detail description for the fields is same with the aforementioned description.

Figure 20:
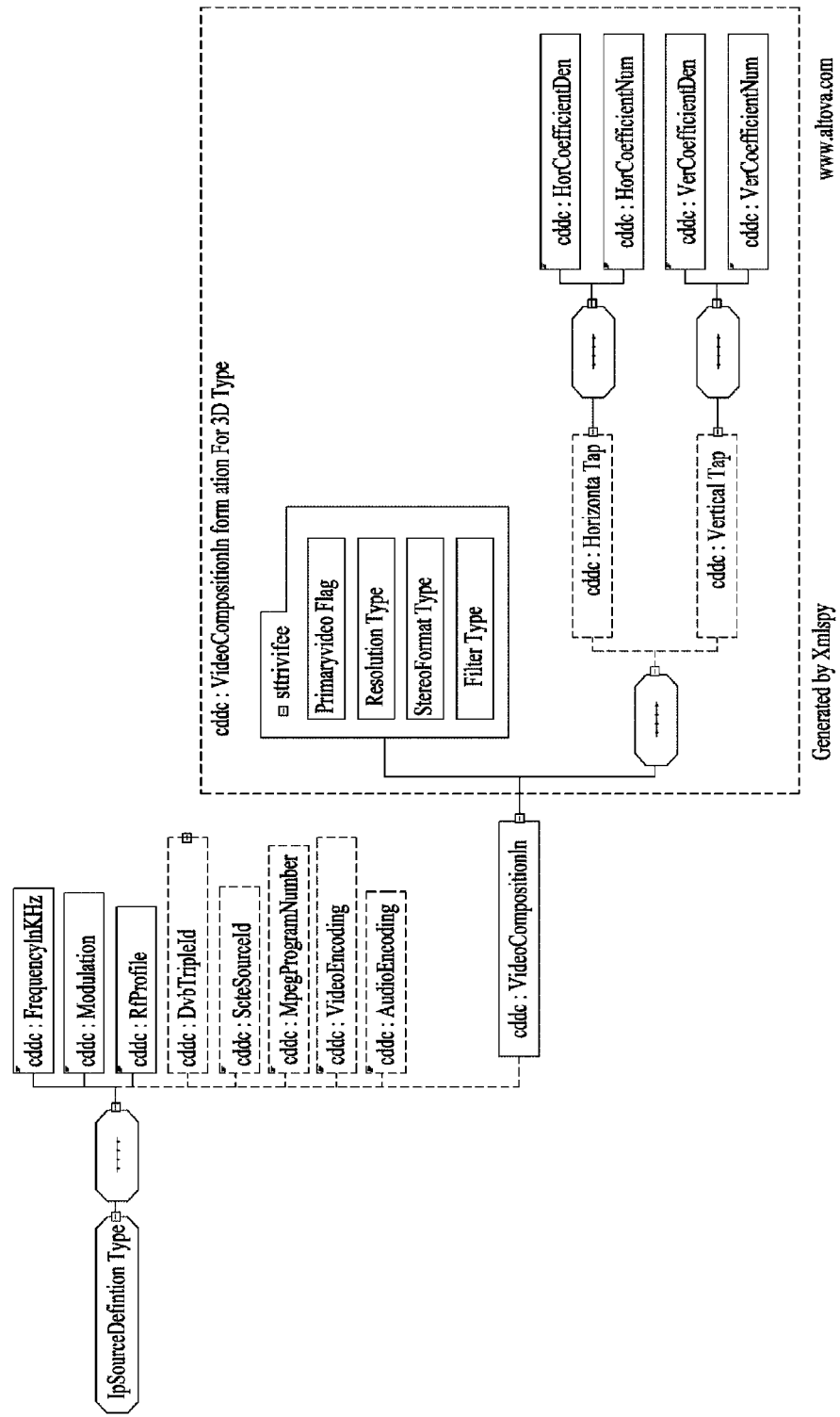
FIG. 20 is a diagram for showing RFSourceDefinitionType XML schema diagram to include 3D video composition information in RfSourceDefinitionType according to one embodiment of the present invention.

FIG. 20 is a diagram for showing RFSourceDefinitionType XML schema diagram to include 3D video composition information in RfSourceDefinitionType according to one embodiment of the present invention.

Referring to FIG. 20, in case of outputting a 3D in a manner of adding a VideoCompositionInformationFor3D element, which is an element of the VideoCompositionInformationFor3DType, to the RfSourceDefinitionType, a method of providing an information on composing two 2D videos is proposed.

According to one embodiment of the present invention, the RfSourceDefinitionType includes a FrequencyInKHz element, a Modulation element, an RfProfile element, a DvbTripleId element, a ScteSourceId element, an MpegProgramNumber element, a VideoEncoding element, an AudioEncoding element and/or a VideoCompositionInformationFor3DType element.

The FrequencyInKHz element represents an RF frequency of a source by KHz unit. This represents a center frequency irrespective of a modulation type.

The modulation element indicates an RF modulation type. For instance, it may represent NTSC, QAM-64, QAM-256, 8-VSB, or the like.

The RfProfile element may indicate a basic stream form. For instance, it may indicate SCTE, ATSC, DVB or the like.

The DvbTripleId element indicates a DVB Triple identifier for a broadcasting stream.

The ScteSourceId element may include a Source ID of MPEG-2 TS.

The MpegProgramNumber element may indicate MPEG-2 program number.

The VideoEncoding element may indicate a description of a video coding used for a programming source.

The AudioEncoding element may indicate a description of an audio coding used for a programming source.

The VideoCompositionInformationFor3DType element signals information on a primary and/or a secondary video element. The VideoCompositionInformationFor3DType element may include a PrimaryVideoFlag field, a ResolutionType filed, a StereoFormatType field, a FilterType field, HorCoefficientDen field, a HoeCoefficientNum field, a VerCoefficientDen field, and/or a VerCoefficientNum field. Detail description for the fields is same with the aforementioned description.

Besides the method of providing 3D video composition information via the aforementioned new signaling side of an IPTV, since medias of the IPTV can be transmitted via an IP network in a manner of being configured as MPEG-2 TS similar to a conventional digital broadcasting form, a method of providing 3D video composition information via various tables of SI side in a TS, which is proposed earlier in the present invention, can be applied identically. In this case, similar to the case of transmitting ATSC or DVB that the present invention proposed, video composition information is transmitted in a manner of being included in MPEG-2 TS and 3D video may be then able to being outputted properly using this.

Figure 21:
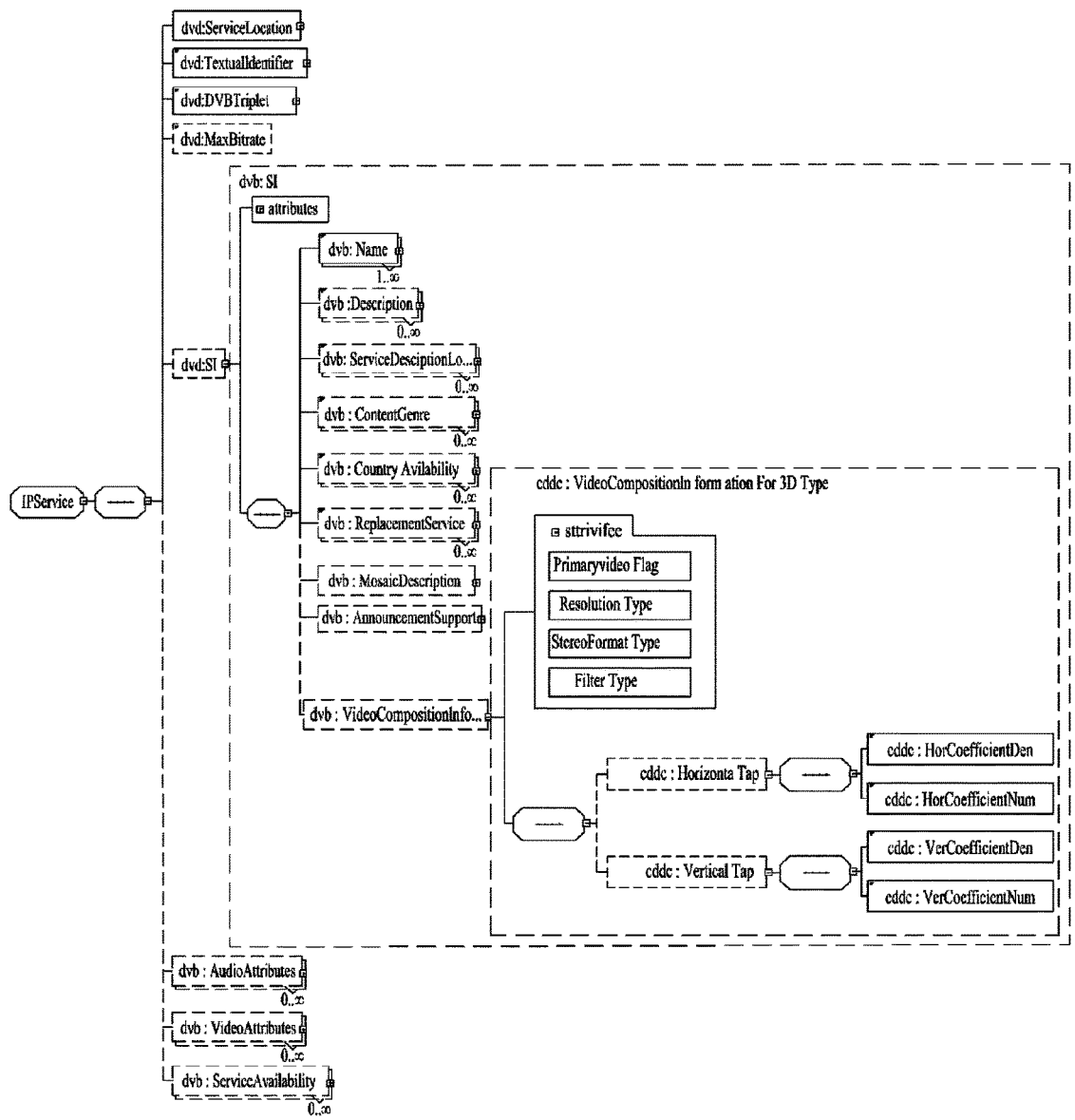
FIG. 21 is a diagram for showing IpService XML schema expanded to include 3D video composition information according to one embodiment of the present invention.

FIG. 21 is a diagram for showing IpService XML schema expanded to include 3D video composition information according to one embodiment of the present invention.

According to one embodiment of the present invention, IpService includes a Servicelocation information, a TextualIdentifier information, a DVBTriplet information, an MaxBitrate information, a SI information, a VideoAttributes information, an AudioAttributes information, and/or a ServiceAvailability information.

The Servicelocation information indicates a location capable of search for a service.

The TextualIdentifier information may indicate an ID of character form indicating a service. In case of losing a domain name, it may be obtained by a text.

The DVBTriplet information may indicate a DVB triplet indicating a service. This information can be matched with a service detail in TS.

The MaxBitrate information may indicate a maximum bit rate (in kbits/s) of TS including a corresponding service.

The SI information may include service information on a service.

The SI information may include a Name information, a description information, a service description location information, a content genre information, a country availability information, a replacement service information, a mosaic description information, an announcement support information, and/or a videoCompositinInformationFor3DType information.

The Name information may represent a service name known to a user in a text form.

The Description information may indicate a character description of a service.

The service description location information may indicate an identifier of a BCG record for a BCG discovery element, which delivers provided information.

The content genre information may indicate a (main) genre of a service.

The country availability information may indicate a list of country according to whether a service is available or not.

The replacement service information may indicate a detail for a connection to a different service in case that an SI record fails to provide a service for a reference.

The mosaic description information may indicate a detail for a service displayed in mosaic stream and a service package.

The announcement support information may indicate an announcement supported by a service. And, it may indicate a link information on a location of the announcement.

The videoCompositinInformationFor3DType information may include a PrimaryVideoFlag field, a ResolutionType filed, a StereoFormatType field, a FilterType field, HorCoefficientDen field, a HoeCoefficientNum field, a VerCoefficientDen field, and/or a VerCoefficientNum field. Detail description for the fields is same with the aforementioned description.

The VideoAttributes information may indicate a video coding method, which can be used in a part timing point of a service operating duration.

The AudioAttributes information may indicate an audio coding method, which can be used in a part timing point of a service operating duration.

The ServiceAvailability information may be able to define an area capable of being provided a corresponding service and the area unable to receive the corresponding service.

According to one embodiment of the present invention, in a DVB IPTV system, each of the IPTV services is represented in DVB SD & S (service discovery and selection) by an IPService unit. Among them, an SI element provides additional detail information on the service. The informations provide most of contents included in SDT of the DVB SI identically. It intends to provide 3D video composition information in a manner of expanding and adding as shown in the following.

It is possible to use DVB SI information within a TS with a form of a conventional DVB broadcasting by transmitting via IP network in a manner of configuring in a MPEG2 TS form in the DVB IPTV system as well like the above mentioned.

Figure 22:
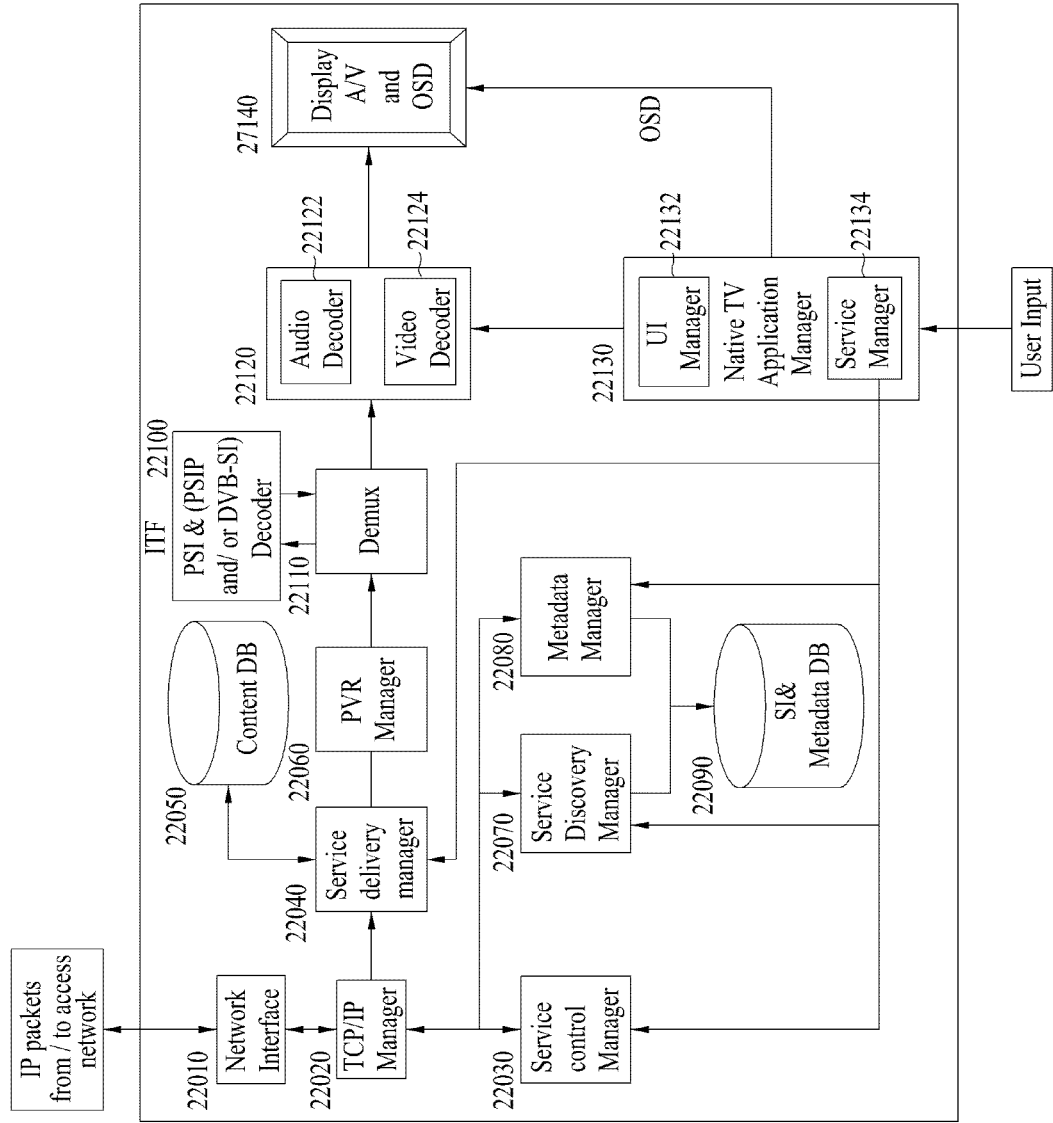
FIG. 22 is a diagram for showing an IPTV receiver according to one embodiment of the present invention.

FIG. 22 is a diagram for showing an IPTV receiver according to one embodiment of the present invention.

According to one embodiment of the present invention, an IPTV receiver includes a network interface 22010, a TCP/IP manager 22020, a service control manager 22030, a service delivery manager 22040, a content DB 22050, a PVR manager 22060, a service discovery manager 22070, a service manager 22080, a SI & metadata DB 22090, a PSI & (PSIP and/or DVB-SI) decoder 22100, a DEMUX 22110, an audio and video decoder 22120, a native TV application manager 22130 and/or an A/V and OSD displayer 22140.

The network interface 22010 plays a role of transmitting/receiving an IPTV packet. The network interface 22010 operates in a physical layer and/or a data link layer.

The TCP/IP manager 22020 participates in an end to end packet transmission. In particular, the TCP/IP manager 22020 performs a role of managing a packet transmission from a source to a destination. The TCP/IP manager 22020 plays a role of transmitting IPTV packets in a manner of classifying into a proper manager.

The service control manager 22030 plays a role of selecting and controlling a service. The service control manager 22030 may perform a role of managing a session. For instance, the service control manager 22030 may select a real time broadcasting service using an internet group management protocol (IGMP). For instance, the service control manager 22030 may select a VOD (video on demand) using an RTSP. For instance, in case that an IP multimedia subsystem (IMS) is used, the service control manager 22030 performs a session initialization and/or a managing via an IMS gateway using a session initiation protocol (SIP). In order to control not only a transmission on demand but also the transmission by TV broadcasting or an audio broadcasting, an RTSP protocol is used. The RTSP protocol uses a continuous TCP connection and supports a trick mode control for a real-time media streaming.

The service delivery manager 22040 participates in a handling of a real-time streaming and/or a content download. The service delivery manager 22040 retrieves contents from a content DB 22050 for later use. The service delivery manager 22040 may be able to use an real-time transfer protocol (RTP)/an RTP control protocol (RTCP), which is used together with an MPEG-2 transport stream (TS). In this case, an MPEG-2 packet is encapsulated using the RTP. The service delivery manager 22040 performs a parsing for an RTP packet and sends the parsed packet to the DEMUX 22110. The service delivery manager 22040 may be able to play a role of transmitting a feedback for a network reception using the RTCP. MPEG-2 transport packets can be directly transmitted using a user datagram protocol (UDP) without a use of the RTP. The service delivery manager 22040 may be able to use a hypertext transfer protocol (HTTP) or a file delivery over unidirectional transport (FLUTE) as a transfer protocol in order to perform a content download. The service delivery manager 22040 may be able to play a role of processing a stream for transmitting 3D video composition information. In particular, in case that the aforementioned 3D video composition information is transmitted to a stream, a processing for this can be performed by the service delivery manager 22040.

The content DB 22050 is a database for the contents transmitted by a content download system or recorded from a live broadcast media TV.

The PVR manager 22060 plays a role of recording and playing a live broadcast streaming content. The PVR manager collects all necessary metadata for a recorded content and collects additional information for a better user environment. For instance, a thumbnail image or an index can be included.

The service discovery manager 22070 enables a two-way IP network to search for an IPTV service. The service discovery manager provides all informations on a service capable of being selected.

The metadata manager 22080 manages a processing of metadata.

The SI & metadata DB 22090 manages metadata in conjunction with a metadata DB.

The PSI & (PSIP and/or DVB-SI) decoder 22100 is a PSI control module. The PSIP or the DVB-SI as well as the PSI can be included in this module and the PSI is used for a concept for including the PSIP or the DVB-SI in the following description. The PSI & (PSIP and/or DVB-SI) decoder 22100 sets PIDs for the PSI table and delivers the PIDs to the DEMUX 22110. The PSI & (PSIP and/or DVB-SI) decoder decodes a PSI private section delivered from the DEMUX 22110. The decoding result sets an audio and video PID and an input TP is used for a demultiplexing.

The DEMUX 22110 demultiplexes an audio, video and PSI table from an input TP (transport packets). The PSI table is controlled to be demultiplexed by the PSI & (PSIP and/or DVB-SI) decoder 22100. The DEMUX generates a PSI table section and outputs the PSI table section to the PSI & (PSIP and/or DVB-SI) decoder 22100. And, an A/V TP is controlled to be demultiplexed by the DEMUX.

The audio and video decoder 22120 may be able to decode video and/or audio elementary stream packets. The audio and video decoder may include an audio decoder 22122 and/or a video decoder 22124. The audio decoder 22122 decodes audio elementary stream packets. The video decoder 22124 decodes video elementary stream packets.

The native TV application manager 22130 includes an UI manager 22132 and/or a service manager 22134. The native TV application manager 22130 supports a graphic user interface in a TV screen. The native TV application manager 22130 may be able to receive a user key by a remote controller or a front panel. The native TV application manager 22130 may be able to manage a state of a TV system. The native TV application manager 22130 may be able to play a role of configuring a 3D OSD and controlling an output.

The UI manager 22132 may be able to perform a control for displaying a user interface in a TV screen.

The service manager 22134 performs a role of controlling a manager, which is related to a service. For instance, the service manager 22134 may be able to control a service control manager 22030, a service delivery manager 22040, an IG-OITF client, a service discovery manager 22070, and/or a metadata manager 22080. The service manager 22134 controls a display of a 3D video image in a manner of processing 3D video composition information.

The A/V and OSD displayer 22140 controls a display of a video data in a manner of receiving an audio and the video data and controls a play of the audio data. The A/V and OSD displayer 22140 outputs a 3D video data in a manner of processing a primary and a secondary video data according to 3D video composition information. The A/V and OSD displayer 22140 may be able to perform such a video data processing as a resizing, a video formatting, a frame rate conversion and the like via filtering for at least one of the primary and the secondary video data according to the 3D video composition information. The A/V and OSD displayer 22140 control to output an OSD. In case of a 3D service, the A/V and OSD displayer 22140 may be able to play a role of a 3D output formatter outputting a left/right video as a stereoscopic video by receiving the left/right video. It shall be possible to output a 3D OSD in a manner of combining together in this procedure. The A/V and OSD displayer may perform a role of a PIP scalar for a 3D PIP service.

Figure 23:
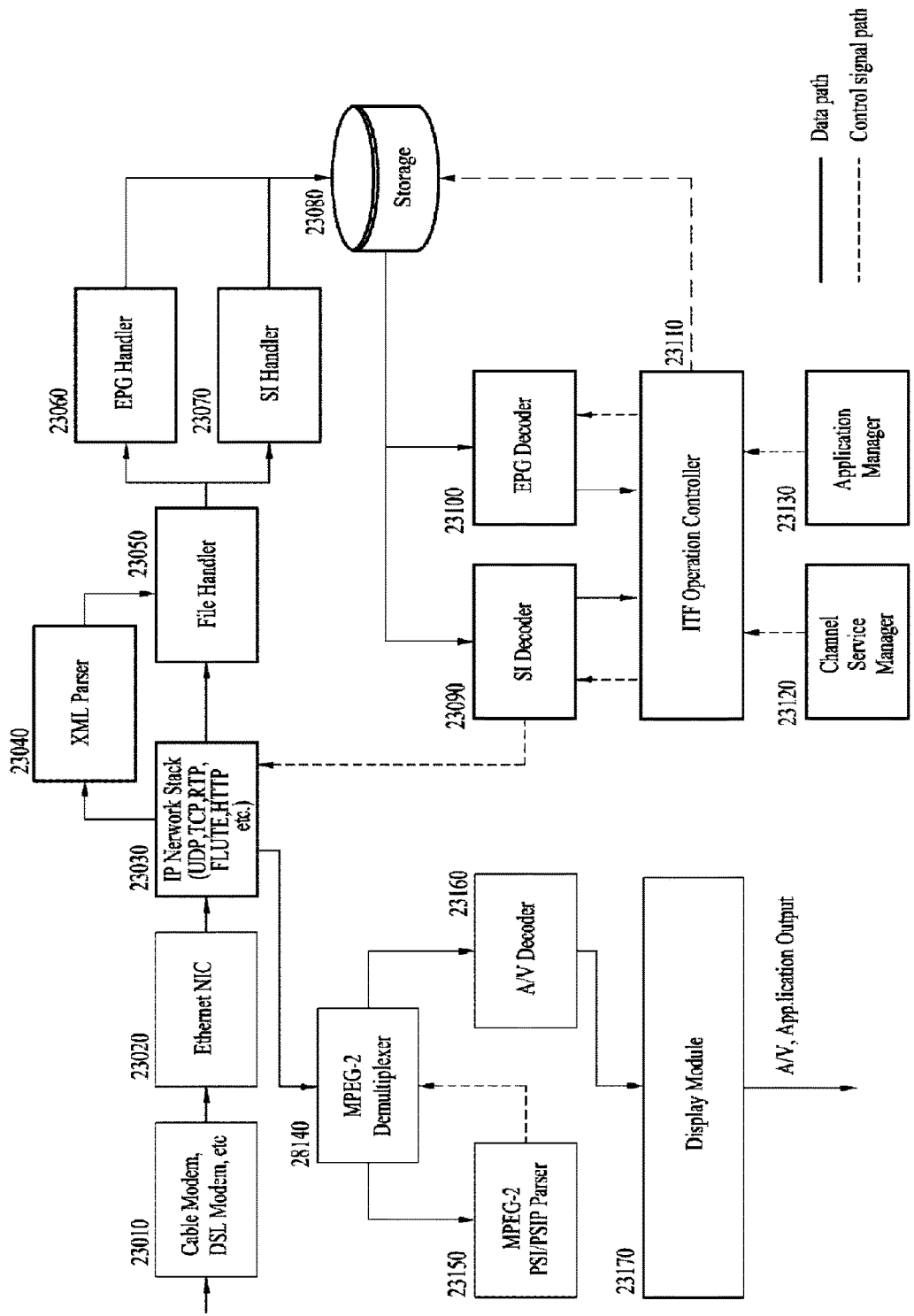
FIG. 23 a diagram for showing function blocks of an IPTV receiver according to one embodiment of the present invention.

FIG. 23 a diagram for showing function blocks of an IPTV receiver according to one embodiment of the present invention.

According to one embodiment of the present invention, the function blocks of the IPTV receiver may be able to include a cable modem, a DSL modem 23010, an Ethernet NIC 23020, an IP network stack 23030, a XML parser 23040, a file handler 23050, an EPG handler 23060, a SI handler 23070, a storing device 23080, a SI decoder 23090, an EPG decoder 23100, an ITF operation controller 23110, a channel service manager 23120, an application manager 23130, an MPEG-2 demultiplexor 23140, an MPEG-2 PSI/PSIP parser 23150, an audio/video decoder 23160 and/or a display module 23170.

The blocks, which are mainly treated in the present invention, are represented by a thick line. A solid line arrow indicates a data path and a dotted line arrow indicates a control signal path. The explanation on the each unit is as follows.

The cable modem and the DSL modem 23010 indicate an interface connecting an ITF to an IP network in a physical layer. The cable modem and the DSL modem restore a digital signal in a manner of demodulating the signal transmitted via a physical media.

The Ethernet NIC is a module restoring a signal transmitted via a physical interface to an IP data.

The IP network stack 23030 is a processing module of each layer according to an IP protocol stack.

The XML parser 23040 is a module parsing a XML document among a received IP data.

The file handler 23050 is a module processing data transmitted in a file form via a FLUTE and the like among a received IP data.

The EPG handler 23060 is a module processing and storing a data corresponding to an IPTV EPG data among a received data of file form in a storing device.

The SI handler 23070 is a module processing and storing a data corresponding to an IPTV SI data among a received data of file form in a storing device.

The storing device 23080 is a storing device storing data such as SI, EPG and the like necessary for storing.

The SI decoder 23090 is a device restoring a necessary information in a manner of bringing SI data from the storing device 23080 and analyzing the SI data in case that a channel map information is required.

The EPG decoder 23100 is a device restoring a necessary information in a manner of bringing EPG data from the storing device 23080 and analyzing the EPG data in case that an EPG information is required.

The ITF operation controller 23110 is a main control unit controlling such an ITF operation as a channel change, an EPG display and the like.

The channel service manager 23120 is a module controlling an operation of channel change by receiving a user input.

The application manager 23130 is a module controlling an application service such as an EPG display and the like by receiving a user input.

The MPEG-2 demultiplexor 23140 is a module extracting an MPEG-2 transmission stream data from a received IP datagram and delivering it to a corresponding module according to each PID.

The MPEG-2 PSI/PSIP parser 23150 is a module extracting and parsing a PIP/PSIP data, which includes information capable of accessing such a program element as PID information of each data (audio/video etc.) of the MPEG-2 transmission stream in a received IP datagram and the like.

The audio/video decoder 23160 is a module delivering a delivered audio/video data to a display module in a manner of decoding.

The display module 23170 processes an inputted AV signal and an OSD signal and the like in a manner combining together and then outputs them via a screen and a speaker. The display module 23170 outputs a 3D video data in a manner of processing a primary and a secondary video data according to 3D video composition information. The display module 23170 may be able to perform such a video data processing as a resizing, a video formatting, a frame rate conversion via a filtering for at least one of the primary and the secondary video data according to the 3D composition information. In case of a 3D video, the display module performs a role of dividing L/R videos, outputting them as a 3D video via a formatter and the like. And, the display module may be able to perform a role of processing an OSD and a 3D video to be displayed together using 3D depth related information.

Figure 24:
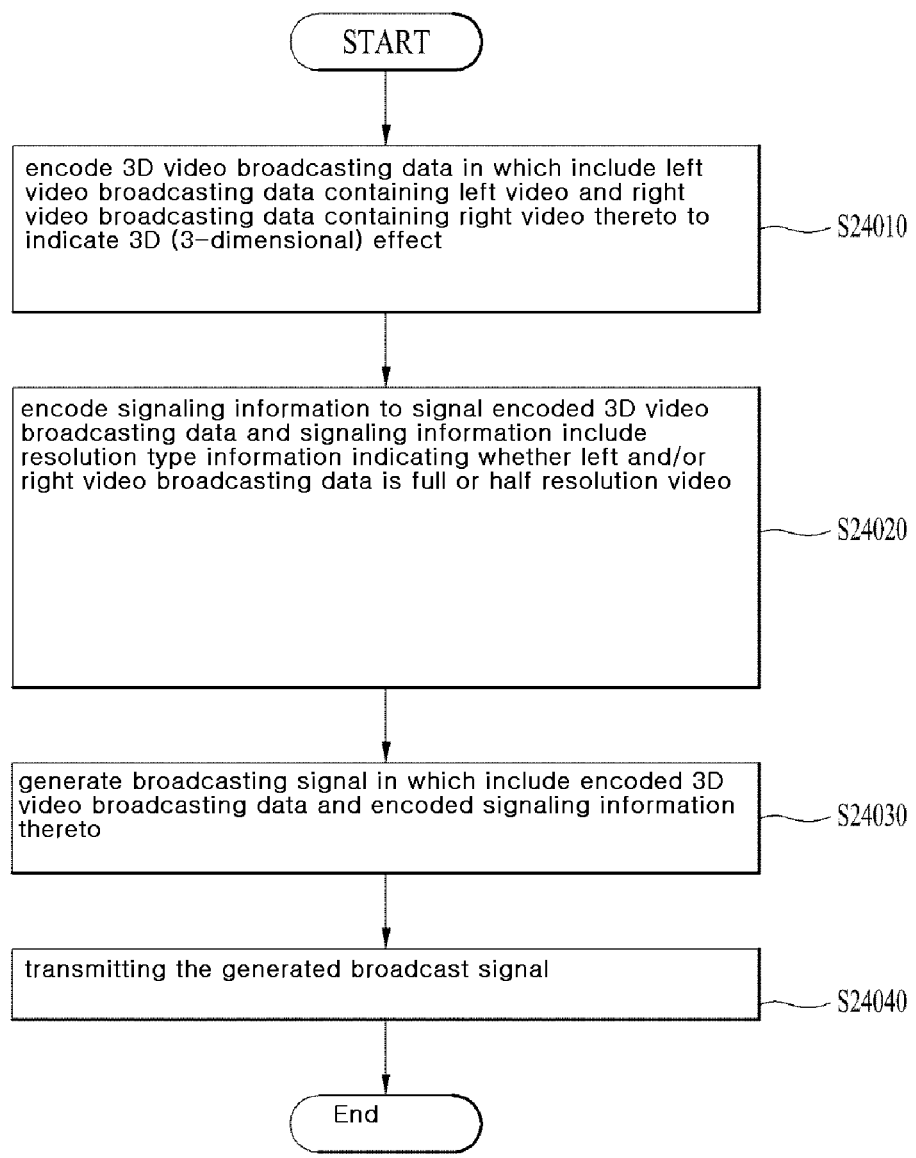
FIG. 24 is a flowchart for showing a broadcasting signal processing method for a 3D broadcasting service according to one embodiment of the present invention.

FIG. 24 is a flowchart for showing a broadcasting signal processing method for a 3D broadcasting service according to one embodiment of the present invention.

A broadcasting transmitter encodes a 3D video broadcasting data which includes a left video broadcasting data containing a left video and a right video broadcasting data containing a right video thereto to indicate a 3D effect [S24010].

The broadcasting transmitter encodes signaling information to signal an encoded 3D video broadcasting data [S24020]. The signaling information may be able to include a resolution type information, which indicates whether a left and/or a right video broadcasting data is a full or a half resolution video.

The resolution type information is encoded as signaling information in a manner of being included in a 3DTV service location descriptor, which signals information on 3D video components. The 3DTV service location descriptor can be included in a program map table (PMT) and/or a service description table (SDT).

The signaling information may further include information indicating which data is provided as a 2D video broadcasting data for a 2D receiver among a left and a right video broadcasting data.

The resolution type information may be able to indicate, in case that a left and/or a right video broadcasting data is a half resolution video, a vertical half resolution, a horizontal half resolution, or a vertical and horizontal half resolution.

In case that one of a left and a right video broadcasting data is a half resolution and the other is a full resolution, the 3DTV service location descriptor may further include filter type information indicating a kind of filter used for doubling the half resolution into the full resolution or a kind of filter used for reducing the full resolution into the half resolution.

The 3DTV service location descriptor may further include filter size information indicating a size of a filter.

The 3DTV service location descriptor may further include information indicating whether a video broadcasting data included in a broadcasting signal is a left or a right video broadcasting data.

The broadcasting transmitter generates a broadcasting signal, which includes an encoded 3D video broadcasting data and encoded signal information [S24030].

The broadcasting transmitter transmits a generated broadcasting signal [S24040].

According to the present invention described in the foregoing description, essential elements for configuring a 3DTV signal are two video streams corresponding to a left and a right video. One of the streams can be signaled to have compatibility with a 2D legacy device.

And, according to the present invention, in case that a video data of a different timing point is difficult to be transmitted in a full resolution due to a limitation of a bandwidth, it can be transmitted in half resolution for an effective compression and it may be able to efficiently transmit the information required to decode the video data.

And, according to the present invention, it may be able to transmit a signaling for a video data additionally transmitted for a 3D broadcasting service and information on a corresponding data using a PSI, a PSIP and/or a DVB SI system.

Moreover, a method of providing, which is provided by a receiver, a good quality of 3D service is provided by signaling resolution information on an additional data (a secondary video), codec information, information on a filtering technique recommended in case of performing a resizing and the like.

A method invention according to the present invention can be recorded in a computer readable media in a manner of being implemented in a program command form capable of being performed by various computer means. The computer readable media may be able to include a program command, a data file, a data structure, and the like separately or collectively. The program command recorded in the media may be specifically designed and configured for the present invention or may be usable in a manner of being publicized by those having ordinary skill in the computer software. The examples of the computer readable recording media may include such a hardware device specifically configured to perform/store the program command as a hard disk, floppy disk, a magnetic media like a magnetic tape, a CD-ROM, an optical media like a DVD, a magneto-optical media like a floptical disk, a ROM, a RAM, a flash memory and the like. The examples of the program command may include a high level language code implementable by a computer using an interpreter and the like as well as a machine code made by a compiler. The above-written hardware devices can be configured to operate by at least one software module to perform an operation of the present invention, and vice versa.

While the present invention has been described and illustrated herein with reference to the preferred embodiments and diagrams thereof, the present invention may be non-limited to the embodiments and it will be apparent to those skilled in the art that various modifications and variations can be made therein without departing from the spirit and scope of the invention. Thus, it is intended that the present invention covers the modifications and variations of this invention that come within the scope of the appended claims and their equivalents.

MODE FOR INVENTION

As mentioned in the foregoing description, the related is described in the best mode for invention.

INDUSTRIAL APPLICABILITY

The present invention can be applied to a 3D broadcasting system field.

What is claimed is:

1. A method of processing a broadcasting signal for a 3D (3-dimensional) broadcasting service, comprising the steps of:
encoding a left video broadcasting data containing a left video into a first video stream and a right video broadcasting data containing a right video into a second video stream,
wherein the first video stream and the second video stream are carried in two separate video streams;
encoding signaling information to signal the 3D broadcasting service;
generating a broadcasting signal which includes the first video stream and second video stream and the encoded signaling information thereto; and
transmitting the generated broadcasting signal,
wherein the signaling information comprises resolution type information indicating information used to specify a first resolution of the left video broadcasting data transmitted in the first video stream and a second resolution of the right video broadcasting data transmitted in the second video stream, and base video information indicating a base video stream including a base video which is used for a 2D receiver and left video information indicating a video stream including the left video broadcasting data.

2. The method of claim 1, wherein the resolution type information is encoded as signaling information in a manner of being included in a 3DTV service location descriptor which signals information on 3D video components and wherein the 3DTV service location descriptor is included in a first signaling information comprising component level information and/or in a second signaling information comprising service level information.

3. The method of claim 1, wherein the resolution type information, if the left and/or the right video broadcasting data is a half resolution video, indicates whether the left and/or the right video broadcasting data is a vertical half resolution, a horizontal half resolution, or a vertical and horizontal half resolution.

4. The method of claim 2, wherein the 3DTV service location descriptor, if one of the left and the right video broadcasting data is a half resolution and the other is a full resolution, further comprises a filter type information indicating a kind of filter used for doubling the half resolution video broadcasting data into the full resolution or the kind of filter used for reducing the full resolution video broadcasting data to the half resolution.

5. The method of claim 4, wherein the 3DTV service location descriptor further comprises information on a filter size indicating a size of the filter.

6. A 3D broadcasting service receiving device, comprising:
a receiving processor to receive a first video stream including a left video broadcasting data containing a left video, a second video stream including a right video broadcasting data containing a right video and signaling information to signal the 3D broadcasting service,
wherein the first video stream and the second video stream are carried in two separate video streams;
a system information processor to parse resolution type information indicating information used to specify a first resolution of the left video broadcasting data transmitted in the first video stream and a second resolution of the right video broadcasting data transmitted in the second video stream, and base video information indicating a base video stream including a base video which is used for a 2D receiver and left video information indicating a video stream including the left video broadcasting data from the signaling information;
a video decoder to decode the first video stream and second video stream; and
a formatter to form a 3D video for a 3D display in a manner of doubling or reducing one of the left and the right video broadcasting data into a full or a half resolution using the resolution type information.

7. The 3D broadcasting service receiving device of claim 6, wherein the system information processor parses a first signaling information comprising component level information and/or a second signaling information comprising service level information included in the signaling information and wherein the system information processor parses the resolution type information included in a 3DTV service location descriptor which signals information on 3D video components included in the parsed first signaling information and/or second signaling information.

8. The 3D broadcasting service receiving device of claim 6, wherein the resolution type information, if the left and/or the right video broadcasting data is a half resolution video, indicates whether the left and/or the right video broadcasting data is a vertical half resolution, a horizontal half resolution, or a vertical and horizontal half resolution.

9. The 3D broadcasting service receiving device of claim 7, wherein the system information processor parses a filter type information indicating a kind of filter used for doubling or reducing one of the left and the right video broadcasting data into a full resolution or a half resolution from the signaling information.

10. The 3D broadcasting service receiving device of claim 9, wherein the system information processor parses information on a filter size indicating a size of the filter included in the 3DTV service location descriptor.

11. The 3D broadcasting service receiving device of claim 7, wherein the system information processor interprets a service type information indicating a kind of service included in the second signaling information and wherein the system information processor identifies the broadcasting signal aimed for a 3D broadcasting service according to whether the 3DTV service location descriptor exists or not.

* * * * *